(12) United States Patent
Horio et al.

(10) Patent No.: US 11,244,790 B2
(45) Date of Patent: Feb. 8, 2022

(54) SOLID ELECTROLYTIC CAPACITOR AND SOLID ELECTROLYTIC CAPACITOR MANUFACTURING METHOD

(71) Applicant: Murata Manufacturing Co., Ltd., Nagaokakyo (JP)

(72) Inventors: Kazutoyo Horio, Nagaokakyo (JP); Takeshi Furukawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/819,804

(22) Filed: Mar. 16, 2020

(65) Prior Publication Data

US 2020/0312573 A1    Oct. 1, 2020

(30) Foreign Application Priority Data

Mar. 28, 2019   (JP) .............................. JP2019-064070

(51) Int. Cl.
*H01G 9/08* (2006.01)
*H01G 9/00* (2006.01)
*H01G 9/15* (2006.01)
*H01G 9/012* (2006.01)

(52) U.S. Cl.
CPC ............. *H01G 9/0029* (2013.01); *H01G 9/08* (2013.01); *H01G 9/15* (2013.01); *H01G 9/012* (2013.01)

(58) Field of Classification Search
CPC .......... H01G 9/0029; H01G 9/08; H01G 9/15; H01G 9/012
See application file for complete search history.

(56) References Cited

U.S. PATENT DOCUMENTS

| 6,771,488 B2 * | 8/2004 | Takagi ................... H01G 9/012 361/509 |
| 6,909,596 B2 * | 6/2005 | Shimoyama ........... H01G 9/012 361/523 |
| 6,977,807 B2 | 12/2005 | Arai et al. |

(Continued)

FOREIGN PATENT DOCUMENTS

| JP | 2005079463 A | 3/2005 |
| JP | 2006324299 A | 11/2006 |
| JP | 2007042832 A | 2/2007 |

OTHER PUBLICATIONS

Japanese Office Action issued for Japanese Application No. 2019-064070, date of Japanese Office Action dated Nov. 2, 2021.

*Primary Examiner* — Dion R. Ferguson
(74) *Attorney, Agent, or Firm* — Arent Fox LLP

(57) ABSTRACT

A solid electrolytic capacitor that includes an element laminate having a first end face and a second end face, a first external electrode on the first end face, and a second external electrode on the second end face. In the element laminate, a first layer and a second layer are stacked. The first layer has a valve-action metal substrate, a dielectric layer on a surface thereof, and a solid electrolyte layer on the dielectric layer. The second layer contains a metal foil. The first layer and the second layer are bonded by an adhesive layer containing a conductive adhesive layer and an insulating adhesive layer that surrounds an outer perimeter of the conductive adhesive layer. The adhesive layer includes a notched part that extends from the first end face or the second end face to the conductive adhesive layer.

17 Claims, 16 Drawing Sheets

(56) References Cited

U.S. PATENT DOCUMENTS

| | | | |
|---|---|---|---|
| 7,550,360 B2* | 6/2009 | Yoshida | H01G 9/012 438/399 |
| 7,898,795 B2* | 3/2011 | Kasuga | H01G 9/012 361/523 |
| 8,213,160 B2* | 7/2012 | Saito | H01G 9/012 361/540 |
| 9,916,935 B2* | 3/2018 | Navratil | H01G 9/052 |
| 9,978,531 B2* | 5/2018 | Kimura | H01G 9/15 |
| 2003/0026064 A1* | 2/2003 | Nakada | H01G 9/042 361/523 |
| 2004/0174660 A1* | 9/2004 | Arai | H01G 9/012 361/523 |
| 2005/0047060 A1* | 3/2005 | Arai | H01G 9/012 361/312 |
| 2011/0149477 A1* | 6/2011 | Summey | H01G 9/012 361/528 |
| 2019/0122827 A1* | 4/2019 | Furukawa | H01G 9/26 |
| 2019/0237266 A1* | 8/2019 | Tsutsumi | H01G 9/14 |
| 2019/0244765 A1* | 8/2019 | Harada | H01G 9/012 |
| 2020/0303130 A1* | 9/2020 | Furukawa | H01G 9/048 |

\* cited by examiner

# SOLID ELECTROLYTIC CAPACITOR AND SOLID ELECTROLYTIC CAPACITOR MANUFACTURING METHOD

CROSS REFERENCE TO RELATED APPLICATIONS

The present application claims priority to Japanese Patent Application No. 2019-064070, filed Mar. 28, 2019, the entire contents of which are incorporated herein by reference.

FIELD OF THE INVENTION

The present invention relates to a solid electrolytic capacitor and a method of manufacturing a solid electrolytic capacitor.

BACKGROUND OF THE INVENTION

A solid electrolytic capacitor is provided with a valve-action metal substrate having a porous part on the surface of a substrate containing a valve-action metal such as aluminum, a dielectric layer formed on the surface of the porous part, a solid electrolyte layer provided on the dielectric layer, and a conductor layer (also referred to as a current collector layer) provided on the solid electrolyte layer.

One method of making a solid electrolytic capacitor involves, for example, forming the porous part on the surface of a substrate containing a valve-action metal such as aluminum, then forming an oxide film on the surface of the porous part, followed by forming a solid electrolyte layer and also forming a carbon layer and a silver layer which act as cathode layers on the surface to make solid electrolytic capacitor elements, and bonding the cathode layers of the capacitor elements together with a conductive adhesive layer.

For example, as disclosed in Patent Literature 1 (JP 2006-324299A), to prevent a lowered ESR caused by the formation of cavities between layers due to gasification of an organic solvent during the heat curing of the conductive adhesive, a conductive sheet may be provided with grooves or notches for releasing gas.

Also, Patent Literature 2 (JP 2005-79463A) discloses bonding the solid electrolytic capacitor elements to each other through an insulating adhesive sheet having notches filled with a conductive adhesive.

SUMMARY OF THE INVENTION

However, in Patent Literature 1, the conductive adhesive layer disposed between the solid electrolytic capacitor elements may reach the anode areas and short the anode—cathode path.

In Patent Literature 2, because the outer side of the conductive adhesive filling the notches is entirely covered by the insulating sheet, the shorting of the anode—cathode path by the conductive adhesive can be prevented, but there is still the unresolved problem of cavities forming due to the gas produced by the heat curing of the conductive adhesive, which lowers the ESR.

To address the above problems, an object of the present invention is to provide a solid electrolytic capacitor capable of both preventing a short and suppressing a decrease in the ESR.

A solid electrolytic capacitor according to the present invention is provided with an element laminate having a first end face and a second end face, a first external electrode on the first end face, and a second external electrode on the second end face. In the element laminate, a first layer and a second layer are stacked. The first layer includes a valve-action metal substrate, a dielectric layer on a surface thereof, and a solid electrolyte layer on the dielectric layer. The second layer contains a metal foil. The first layer and the second layer are bonded by an adhesive layer containing a conductive adhesive layer and an insulating adhesive layer that surrounds an outer perimeter of the conductive adhesive layer. In the element laminate, the metal foil and a first sealing part are exposed on the first end face, and the valve-action metal substrate and a second sealing part are exposed on the second end face. The first external electrode is conductively connected to the metal foil. The second external electrode is conductively connected to the valve-action metal substrate. The adhesive layer has a notched part that extends from the first end face or the second end face to the conductive adhesive layer.

A method of manufacturing a solid electrolytic capacitor according to the present invention includes:
(A) preparing a first sheet;
(B) preparing a second sheet;
(C) forming an insulating adhesive layer on the first sheet and/or the second sheet;
(D) forming a conductive adhesive layer on the first sheet and/or the second sheet;
(E) making a laminated sheet;
(F) making a laminated block;
(G) making a plurality of element laminates by cutting the laminated block; and
(H) forming a first external electrode and a second external electrode.

According to the present invention, it is possible to both prevent a short and suppress a decrease in the ESR in a solid electrolytic capacitor.

BRIEF DESCRIPTION OF THE DRAWINGS

FIG. 5A is a perspective view schematically illustrating an example of a first sheet, while

FIG. 6A is a perspective view schematically illustrating an example of a second sheet, while

FIG. 7A is a perspective view schematically illustrating an example of a first sheet provided with an insulating adhesive layer, while

FIG. 8A is a perspective view schematically illustrating an example of a first sheet provided with a conductor layer, while

FIG. 9A is a perspective view schematically illustrating an example of a first sheet provided with a conductive adhesive layer, while

FIG. 10A is a perspective view schematically illustrating an example of a state before laminating first sheets and second sheets, while

FIG. 11A is a perspective view schematically illustrating an example of a laminated block, while

FIG. 12A is a plan view schematically illustrating a valve-action metal substrate before cutting, while

FIG. 13A is a plan view schematically illustrating a metal foil before cutting, while

FIG. 14A is a perspective view schematically illustrating an example of a laminated block after being cut, while

FIG. 15A is a perspective view schematically illustrating an example of a laminated block in which a fourth sealing part is formed, while

FIG. 16A is a perspective view schematically illustrating an example of diced element laminates, while

FIG. 17A is a perspective view schematically illustrating an example of a second sheet provided with an insulating adhesive layer, while

DETAILED DESCRIPTION OF THE PREFERRED EMBODIMENTS

Hereinafter, a solid electrolytic capacitor and a method of manufacturing a solid electrolytic capacitor according to the present invention will be described. However, the present invention is not limited to the following configurations, and the following configurations may be appropriately modified within a scope that does not depart from the gist of the present invention. Note that a combination of two or more of the individual desired configurations of the present invention described below is itself a configuration of the present invention.

[Solid Electrolytic Capacitor]

A solid electrolytic capacitor according to the present invention is provided with an element laminate, a first external electrode, and a second external electrode. In the element laminate, a first layer and a second layer are stacked. The first layer has a valve-action metal substrate having a dielectric layer on a surface thereof, and a solid electrolyte layer on the dielectric layer. The second layer contains a metal foil. The first layer and the second layer are bonded by an adhesive layer containing a conductive adhesive layer and an insulating adhesive layer, such that when viewing the element laminate from a laminating direction, the insulating adhesive layer is disposed surrounding an outer perimeter of the conductive adhesive layer. Furthermore, in the element laminate, of a first end face and a second end face opposing each other in a length direction, the metal foil and a first sealing part are exposed on the first end face, while the valve-action metal substrate and a second sealing part are exposed on the second end face. The first external electrode is on the first end face of the element laminate and is conductively connected to the metal foil. The second external electrode is on the second end face of the element laminate and is conductively connected to the valve-action metal substrate. The adhesive layer is provided with a notched part, the notched part being a region where the insulating adhesive layer is not provided that extends from the first end face or the second end face to the conductive adhesive layer.

One example of a solid electrolytic capacitor according to the present invention will be described with reference to FIGS. 1A, 1B, and 2.

Figure 1A:
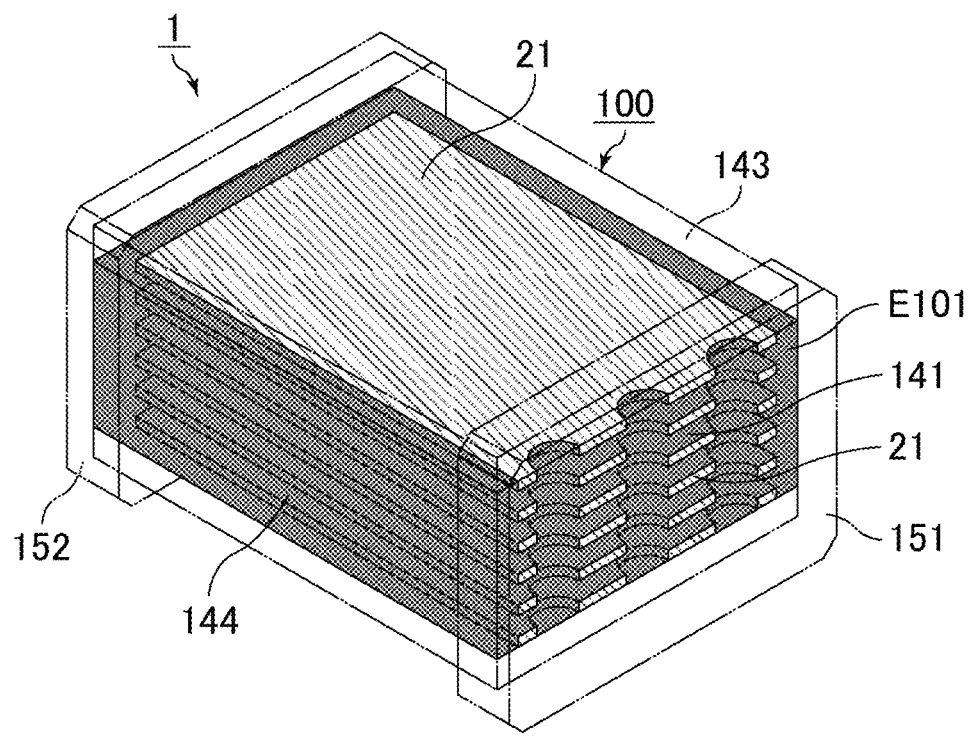
FIGS. 1A and 1B are perspective views schematically illustrating an example of a solid electrolytic capacitor according to the present invention.
Figure 1B:
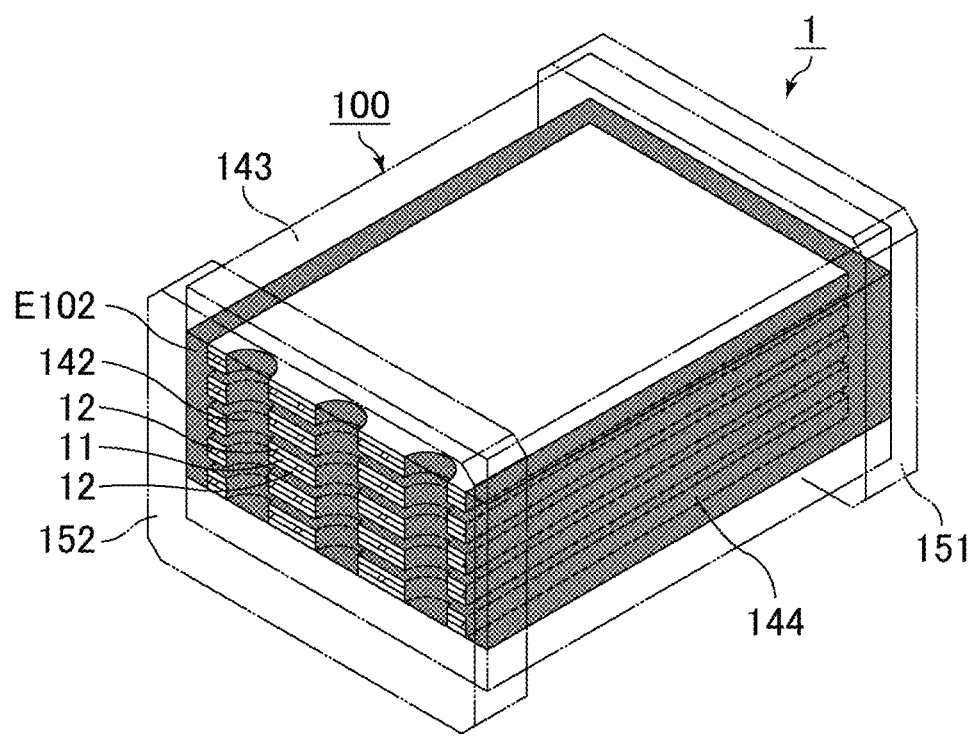

FIGS. 1A and 1B are perspective views schematically illustrating an example of the solid electrolytic capacitor according to the present invention. As illustrated in FIGS. 1A and 1B, a solid electrolytic capacitor 1 includes an element laminate 100, a first external electrode 151 provided on a first end face E101 of the element laminate 100, and a second external electrode 152 provided on a second end face E102.

A metal foil 21 and a first sealing part 141 are exposed on the first end face E101 of the element laminate 100, while a valve-action metal substrate 11 and a second sealing part 142 are exposed on the second end face E102.

Note that a dielectric layer 12 is also exposed on the second end face E102 of the element laminate 100, but the following description will simply state that "the valve-action metal substrate 11 and the second sealing part 142 are exposed".

Also, the top and bottom faces in the laminating direction of the element laminate 100 are sealed by a third sealing part 143, while the side faces of the element laminate 100 are sealed by a fourth sealing part 144.

Figure 2:
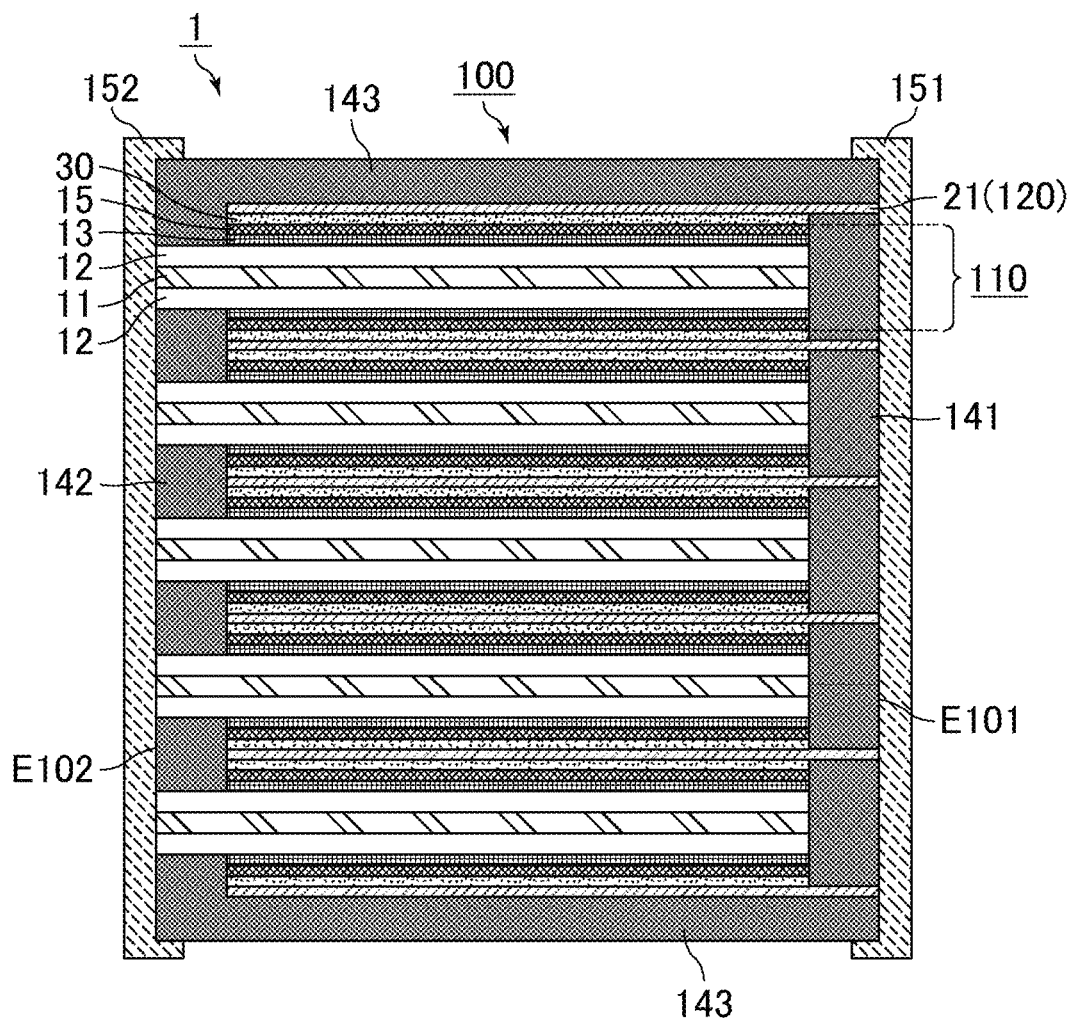
FIG. 2 is a cross-section view schematically illustrating an example of the solid electrolytic capacitor according to the present invention.

FIG. 2 is a cross-section view schematically illustrating an example of the solid electrolytic capacitor according to the present invention.

As illustrated in FIG. 2, the element laminate 100 includes a first layer 110 and a second layer 120. The first layer 110 is provided with a valve-action metal substrate 11 having a dielectric layer 12 formed on the surface thereof, a solid electrolyte layer 13 provided on the dielectric layer 12, and a conductor layer 15 provided on the solid electrolyte layer 13. The second layer 120 contains a metal foil 21. The first layer 110 and the second layer 120 are bonded by an adhesive layer 30.

On the first end face E101, because the first layer 110 is sealed by the first sealing part 141, the valve-action metal substrate 11 is not connected to the first external electrode 151.

On the second end face E102, because the metal foil 21 contained in the second layer 120 is sealed by the second sealing part 142, the metal foil 21 is not connected to the second external electrode 152.

Note that the top and bottom faces in the laminating direction of the element laminate 100 are sealed by the third sealing part 143.

The configuration of the adhesive layer will be described with reference to FIG. 3.

Figure 3:
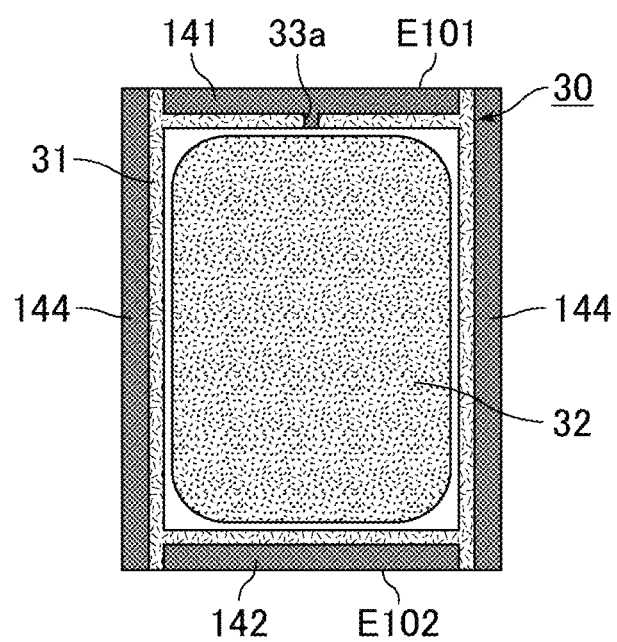
FIG. 3 is a cross-section view schematically illustrating an example of an adhesive layer included in the solid electrolytic capacitor according to the present invention.

FIG. 3 is a cross-section view schematically illustrating an example of an adhesive layer included in the solid electrolytic capacitor according to the present invention. As illustrated in FIG. 3, when the element laminate 100 is viewed from the laminating direction, the adhesive layer 30 contains an insulating adhesive layer 31 disposed surrounding the outer perimeter of a conductive adhesive layer 32. The adhesive layer 30 is provided with a notched part 33a, which is a region where the insulating adhesive layer 31 is not provided, extending from the first end face to the conductive adhesive layer 32. The notched part 33a is also sealed by the first sealing part 141. Also, the side faces of the element laminate 100 are sealed by the fourth sealing part 144.

In the adhesive layer 30, because the conductive adhesive layer 32 is surrounded by the insulating adhesive layer 31, the conductive adhesive layer 32 can be prevented from leaking to the outside.

Furthermore, because the insulating adhesive layer 31 is provided with the notched part 33a, gas produced when heat-curing the conductive adhesive layer 32 can be exhausted to the outside through the notched part 33a, and a lowered ESR can be suppressed. Note that the notched part 33a illustrated in FIG. 3 is sealed by the first sealing part 141. Such a configuration is obtained by filling the notched part with a sealant after heat-curing the conductive adhesive layer.

[Element Laminate]

The element laminate is a laminate of the first layer and the second layer.

The first layer and the second layer are bonded by the adhesive layer containing the conductive adhesive layer and the insulating adhesive layer.

The first layer of the element laminate is provided with the valve-action metal substrate having the dielectric layer formed on the surface thereof, and the solid electrolyte layer provided on the dielectric layer. The second layer contains the metal foil.

The metal foil and the first sealing part are exposed on the first end face of the element laminate, while the valve-action metal substrate and the second sealing part are exposed on the second end face. Also, the first external electrode is connected to the metal foil exposed on the first end face, and the second external electrode is connected to the valve-action metal substrate exposed on the second end face.

[First Layer]

The valve-action metal substrate contains a valve-action metal exhibiting what is referred to as a valve action. Examples of valve-action metals include metals such as aluminum, tantalum, niobium, titanium, and zirconium, as well as alloys containing these metals. Of these, aluminum or an aluminum alloy is preferable.

The shape of the valve-action metal substrate is preferably tabular, and more preferably a foil.

A porous part is preferably provided on the surface of the valve-action metal substrate.

When a porous part is provided on the surface of the valve-action metal substrate, the specific surface area of the valve-action metal substrate can be increased, and the capacitance of the solid electrolytic capacitor can be raised.

The porous part may be, for example, an etching layer formed on the surface of the valve-action metal substrate, or a porous layer formed by printing or sintering on the surface of the valve-action metal substrate. In the case where the valve-action metal is aluminum or an aluminum alloy, an etching layer is preferable, whereas in the case of titanium or a titanium alloy, a porous layer is preferable.

The thickness of the valve-action metal substrate is not limited, but the thickness of the portion excluding the porous part is preferably 5 µm to 100 µm. Also, the thickness of the porous part (thickness on one side) is preferably 5 µm to 200 µm.

The dielectric layer formed on the surface of the porous part is porous to reflect the surface state of the porous part, and has a fine irregular surface shape. The dielectric layer is preferably an oxide film of the valve-action metal described above.

Also, from the perspective of increasing manufacturing efficiency, a chemical foil pretreated with a chemical conversion treatment may be used as the valve-action metal substrate having the dielectric layer formed on the surface thereof.

Examples of the material used to form the solid electrolyte layer include conducting polymers such as polypyrroles, polythiophenes, and polyanilines. Of these, polythiophenes are preferable, and poly(3,4-ethylenedioxythiophene) called PEDOT is particularly preferable. Additionally, the above conducting polymers may also include dopants such as polystyrene sulfonate (PSS).

A conductor layer may also be provided on the solid electrolyte layer.

The conductor layer preferably contains a carbon layer only, but may also contain a silver layer only, or the conductor layer may be dual-layered containing a carbon underlayer with a silver layer on top. The carbon layer and the silver layer can be provided by respectively applying carbon paste and silver paste, for example.

[Second Layer]

The second layer contains the metal foil.

The metal foil preferably contains at least one metal selected from the group consisting of aluminum, copper, silver, and alloys primarily made of these metals.

If the metal foil contains any of the above metals, the resistance of the metal foil can be lowered, and the ESR can be lowered.

Additionally, a metal foil having a carbon coat or a titanium coat formed on the surface by a film deposition method such as sputtering or vapor deposition may be used as the metal foil.

The thickness of the metal foil is not limited, but from the perspective of lowering the ESR, the thickness of the metal foil is preferably 5 µm to 100 µm.

The surface of the metal foil is preferably roughened.

Roughening the surface of the metal foil improves the adhesion between the metal foil and the conductive adhesive layer or the adhesion between the metal foil and the other conductor layer, and therefore the ESR can be lowered.

The method of roughening the surface is not limited, but a roughened surface may be formed by etching or the like. In the case of using aluminum in particular, applying a carbon coat or a titanium coat to a roughened (etched) surface is preferable for lowering the resistance.

In addition, a coat layer containing an anchor coating agent may also be formed on the surface of the metal foil.

Forming a coat layer containing an anchor coating agent on the surface of the metal foil improves the adhesion between the metal foil and the solid electrolyte layer or the adhesion between the metal foil and the other conductor layer, and therefore the ESR can be lowered.

[Adhesive Layer]

The first layer and the second layer of the element laminate are bonded by the adhesive layer containing the conductive adhesive layer and the insulating adhesive layer. When viewing the element laminate from the laminating direction, the insulating adhesive layer is disposed surrounding the outer perimeter of the conductive adhesive layer.

Consequently, a short caused by the conductive adhesive layer contacting the anode can be prevented.

Examples of the material used to form the conductive adhesive layer include a mixture of an insulating resin such as an epoxy resin or a phenol resin and conductive particles such as carbon or silver.

Examples of the material used to form the insulating adhesive layer include an insulating resin such as an epoxy resin or a phenol resin.

The adhesive layer is provided with the notched part, which is a region where the insulating adhesive layer is not provided, extending from the first end face or the second end face to the conductive adhesive layer.

Consequently, gas produced when heat-curing the conductive adhesive layer can be exhausted to the outside through the notched part, and a lowered ESR can be suppressed.

The notched part may be provided in just a single location or in a plurality of locations.

The position where the notched part is provided is not limited, and for example, the notched part may be provided in a corner area of the insulating adhesive layer.

A corner area refers to a region within 20% of the distance from an apex to another adjacent apex of the region surrounded by the insulating adhesive layer when viewing the element laminate from the laminating direction. Because the corner areas are not easily filled with the conductive adhesive layer, by providing the notched part in one or more corner areas of the insulating adhesive layer, the leakage of excess conductive adhesive layer to the outside from the notched part can be suppressed.

The width of the notched part is not limited, but is preferably 50 μm to 500 μm.

The notched part may also be provided obliquely.

If the notched part is provided obliquely, the length of the notched part is increased, and the conductive adhesive does not easily leak out from the notched part.

Note that providing the notched part obliquely means providing the notched part along a direction inclined from the direction in which the length of the notched part is the shortest.

The inclination angle of the notched part with respect to the direction of shortest length of the notched part is preferably 30° to 60°.

The notched part may or may not be filled with a sealant.

Filling the notched part with a sealant improves the adhesive strength between the adhesive layer and the sealing parts.

FIGS. 4A to 4D will be referenced to describe the position where each notched part is provided and the number of notched parts.

FIGS. 4A to 4D are cross-section views schematically illustrating other examples of the adhesive layer included in the solid electrolytic capacitor.

Figure 4A:
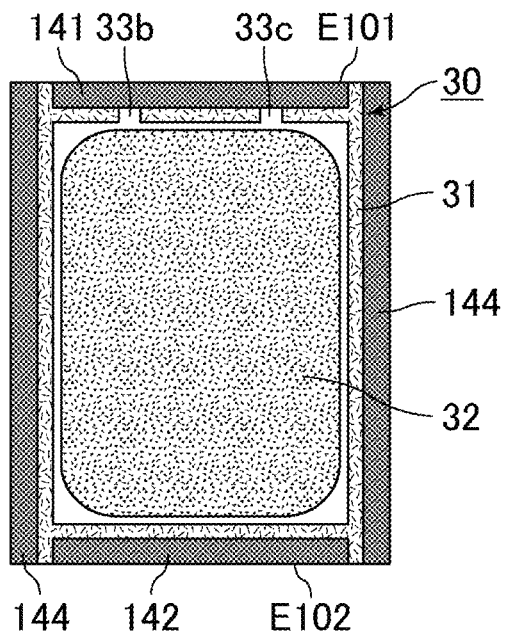
FIGS. 4A to 4D are cross-section views schematically illustrating other examples of the adhesive layer included in the solid electrolytic capacitor.

In FIG. 4A, two notched parts $33b$ and $33c$ are provided on the cathode side.

If a plurality of notched parts exists, the gas produced by the heat curing of the conductive adhesive layer is exhausted more easily.

Figure 4B:
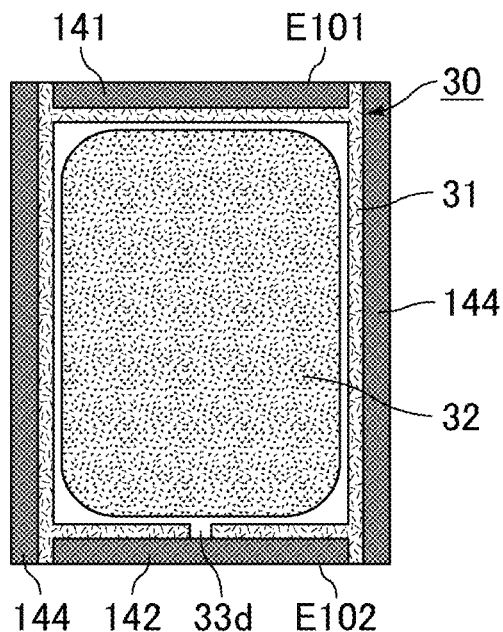

In FIG. 4B, a notched part $33d$ is provided on the anode side.

Figure 4C:
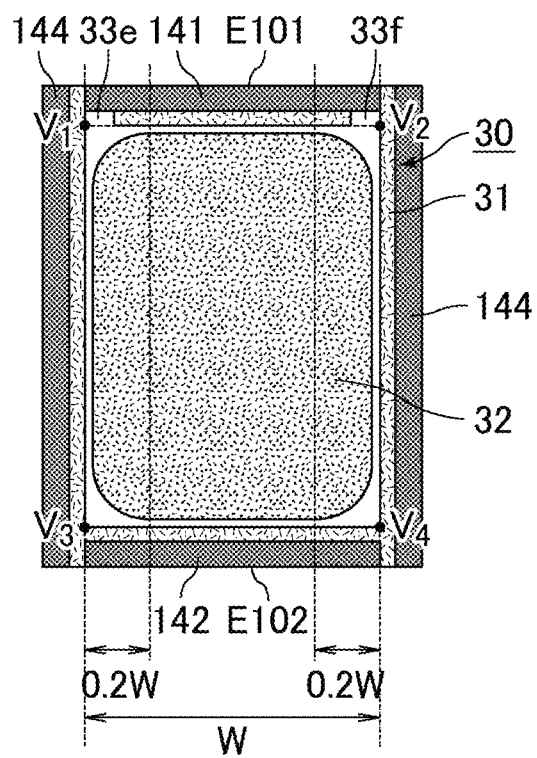

In FIG. 4C, two notched parts $33e$ and $33f$ are provided in corner areas of the element region.

When the region enclosed by the insulating adhesive layer 31 is seen as a polygon (a quadrilateral $V_1V_2V_4V_3$), each of the notched parts $33e$ and $33f$ is provided in a region within 20% of the distance from an apex ($V_1$ or $V_2$) to another adjacent apex ($V_2$ or $V_1$) existing on an edge $V_1V_2$ (length W) bordering the first end face E101 side, or in other words, in a corner area. Because the conductive adhesive layer is not pushed out easily into the corner areas of the element region, the conductive adhesive layer does easily leak to the outside.

Note that the notched parts $33e$ and $33f$ are not considered when computing the region (quadrilateral $V_1V_2V_4V_3$) enclosed by the conductive adhesive layer.

Figure 4D:
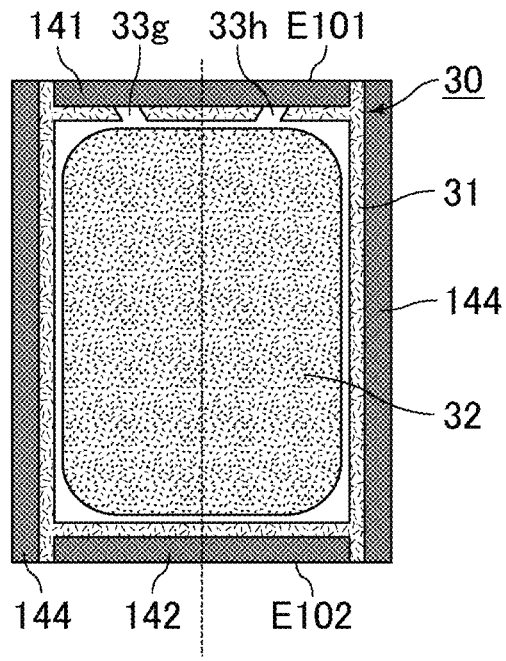

In FIG. 4D, two notched parts $33g$ and $33h$ are provided on the cathode side. The notched parts $33g$ and $33h$ are provided obliquely along a direction inclined from the length direction of the element laminate 100 (in FIG. 4D, the length direction is the direction indicated by the dashed line, and is also the direction in which the length of the notched parts is the shortest).

If the notched parts are provided obliquely, the lengths of the notched parts are increased, and the conductive adhesive layer does not easily leak to the outside.

Note that although FIGS. 4A to 4D are used to describe examples in which the notched parts are not sealed by the sealing parts, the notched parts may also be sealed by the sealing parts like in FIG. 3.

[Sealing Parts]

Each of the first sealing part and the second sealing part contains a sealant.

The sealant contains at least a resin, and preferably contains a resin and a filler.

The resin contained in the sealant may be an epoxy resin or a phenol resin, for example. Also, the filler contained in the sealant may be silica particles, alumina particles, or metal particles, for example.

Also, in the case where the sealant contains a resin and a filler, the maximum diameter of the filler is preferably smaller than the minimum thickness of the metal foil to ensure the filling ability of the sealant.

The maximum diameter of the filler contained in the sealant is preferably in a range from 30 μm to 40 μm, for example.

[First External Electrode]

The first external electrode is provided on the first end face of the element laminate and is also connected to the metal foil. Consequently, the first external electrode acts as the cathode.

[Second External Electrode]

The second external electrode is provided on the second end face of the element laminate and is also connected to the valve-action metal substrate. Consequently, the second external electrode acts as the anode.

The first external electrode and the second external electrode can be formed by plating, sputtering, dip-coating, or printing, for example. In the case of plating, a plating layer such as a Zn—Ag—Ni layer, Ag—Ni layer, Ni layer, Zn—Ni—Au layer, Ni—Au layer, Zn—Ni—Cu layer, or Ni—Cu layer can be used. On top of these plating layers, it is preferable to form additional plating layers such as a Cu plating layer, an Ni plating layer, and an Sn plating layer (or a subset thereof) in succession, for example.

The solid electrolytic capacitor according to the present invention is made according to the method of manufacturing a solid electrolytic capacitor of the present invention described below.

The method of manufacturing a solid electrolytic capacitor according to the present invention includes:

(A) preparing a first sheet;
(B) preparing a second sheet;
(C) forming an insulating adhesive layer on the first sheet and/or the second sheet;
(D) forming a conductive adhesive layer on the first sheet and/or the second sheet;
(E) making a laminated sheet;
(F) making a laminated block;

(G) making a plurality of element laminates by cutting the laminated block; and (H) forming a first external electrode and a second external electrode.

[Step (A)]

In step (A), the first sheet is prepared.

The first sheet is provided with the valve-action metal substrate having the dielectric layer formed on the surface thereof, and the solid electrolyte layer provided on the dielectric layer.

Additionally, the first sheet has a plurality of element regions. Each element region is partitioned by a first end part and a second end part which oppose each other in the length direction, and by a first side part and a second side part which oppose each other in the width direction.

One example of the first sheet prepared in step (A) will be described with reference to FIGS. 5A and 5B.

Figure 5A:
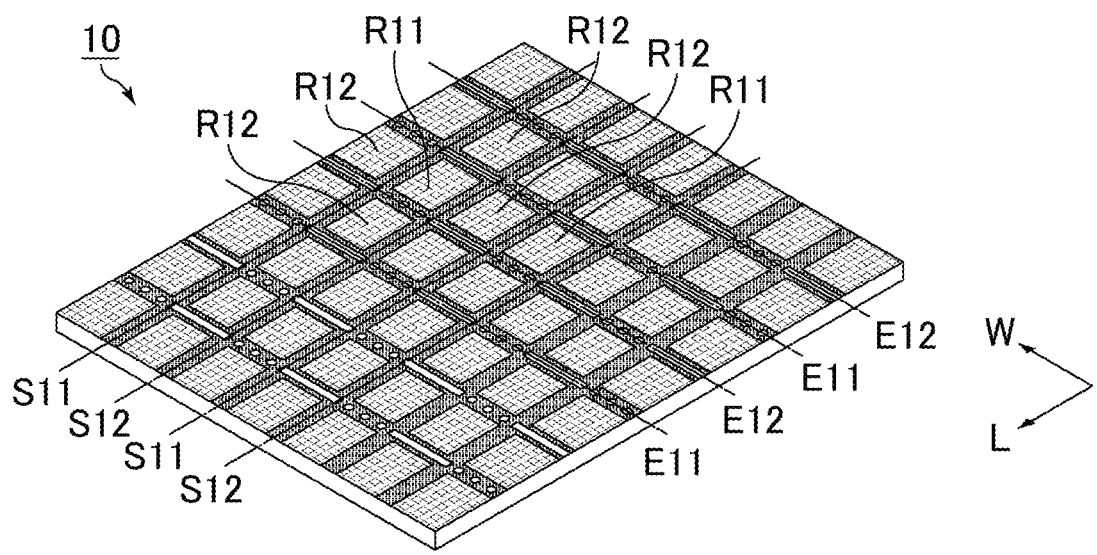
Figure 5B:
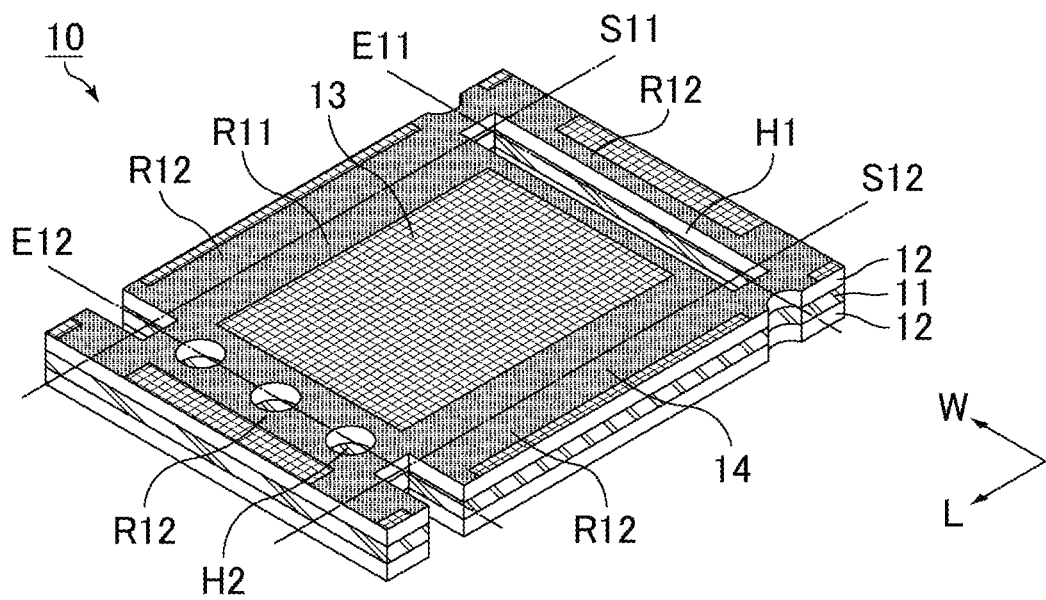
FIG. 5B is an enlarged perspective view of a portion of FIG. 5A.

FIG. 5A is a perspective view schematically illustrating an example of a first sheet, while FIG. 5B is an enlarged perspective view of a portion of FIG. 5A.

A first sheet 10 illustrated in FIGS. 5A and 5B includes a plurality of element regions R11 (hereinafter referred to as first element regions) and a plurality of element regions R12 (hereinafter referred to as second element regions). As illustrated in FIG. 5B, the first element regions R11 are partitioned by a first end part E11 and a second end part E12 which oppose each other in the length direction (L direction), and by a first side part S11 and a second side part S12 which oppose each other in the width direction (W direction). In the first element regions R11, the dimension in the length direction (L direction) is greater than the dimension in the width direction (W direction). Furthermore, a single first through-hole H1 is formed straddling the first end parts E11 of the first element regions R11 in the length direction, while in addition, a plurality of second through-holes H2 (three in FIG. 5B) are formed straddling the second end parts E12 of the first element regions R11 in the length direction. The first through-hole H1 is a single long hole as wide or wider than one of the first element regions R11, while the second through-holes H2 are multiple approximately round holes less wide than one of the first element regions R11.

On the other hand, the second element regions R12 have the same shape as the first element regions R11, but the directions of the first end part E11 and the second end part E12 are the reverse of the first element regions R11.

As illustrated in FIG. 5A, in the first sheet 10, the first element regions R11 and the second element regions R12 are disposed alternately in the length direction. As illustrated in FIG. 5B, each first element region R11 shares the first end part E11 and the first through-hole H1 with an adjacent second element region R12, while also sharing the second end part E12 and the second through-holes H2 with another adjacent second element region R12.

The first through-hole and the second through-holes are formed by laser processing, etching, or punching, for example.

Furthermore, as illustrated in FIG. 5A, in the first sheet 10, the first element regions R11 and the second element regions R12 are disposed alternately in the width direction. As illustrated in FIG. 5B, each first element region R11 shares the first side part S11 with an adjacent second element region R12, while also sharing the second side part S12 with another adjacent second element region R12.

As illustrated in FIG. 5B, the first sheet 10 is provided with the valve-action metal substrate 11 having the porous part (not illustrated) on the surface, the dielectric layer 12 formed on the surface of the porous part, and the solid electrolyte layer 13 respectively provided on the dielectric layer 12 inside each element region. In the first sheet 10, the end parts and the side parts of each element region are covered by a mask layer 14 containing an insulating material, and the solid electrolyte layer 13 is provided in the region enclosed by the mask layer 14. Note that the mask layer 14 is omitted in the following diagrams.

In the first sheet 10 illustrated in FIG. 5B, the valve-action metal substrate 11 has the porous part on both faces, and the dielectric layer 12 is formed on the surface of each porous part and the solid electrolyte layer 13 is provided on each dielectric layer 12. However, in the case where a second sheet 20 is not stacked onto one of the faces of the first sheet 10, it is not necessary to provide the solid electrolyte layer 13 on the surface of the valve-action metal substrate 11 on the side where the second sheet 20 (metal foil 21) is not stacked. In this case, the dielectric layer and the porous part also do not have to be formed on the surface of the valve-action metal substrate on the side where the second sheet (metal foil) is not stacked. Also, a sheet in which the porous part is provided on only one face of the valve-action metal substrate 11 and the dielectric layer 12 is formed on the surface of the porous part may be used as the first sheet 10.

Note that the first through-hole H1 and the second through-holes H2 may be formed before forming the mask layer 14, or after forming the solid electrolyte layer 13.

The overall size of the first sheet is determined according to factors such as the size, shape, number, arrangement, and production capacity of the element regions, and is not limited. The shape of the element regions of the first sheet is not limited, but a rectangular shape is preferable. In this case, the first end part and the second end part may be shorter or longer than the first side part and the second side part.

From the perspective of manufacturing efficiency, the first sheet contains a plurality of element regions. In particular, the first sheet contains the first element regions and the second element regions, with the first element regions and the second element regions preferably being disposed alternately in the length direction, and more preferably disposed alternately in the width direction as well. In the case where the first element regions and the second element regions are disposed alternately, the first through-hole is not unevenly distributed in the width direction of the first sheet, and therefore the sheet strength is not lowered as much.

In the first sheet, in the case where the first element regions and the second element regions are disposed alternately in the length direction, each first element region preferably shares the first end part and the first through-hole with an adjacent second element region, while also sharing the second end part and the second through-holes with another adjacent second element region. In this case, the number of cuts for dividing the element regions and the portions to dispose of can be reduced.

However, in the case where the first sheet contains the first element regions and the second element regions, the first element regions and the second element regions do not have to be disposed alternately in the length direction or the width direction. Also, in the case where the first element regions and the second element regions are disposed alternately in the length direction, each first element region does not have to share the first end part and the first through-hole with an adjacent second element region, and does not have to share the second end part and the second through-holes with another adjacent second element region. Furthermore, in the case where the first element regions and the second element regions are disposed alternately in the width direction, each first element region does not have to share the first side part with an adjacent second element region, and does not have to share the second side part with another adjacent second element region.

The shape of the first through-hole is not limited insofar as the first through-hole is as wide or wider than the element region.

Features such as the shape, number, and arrangement of the second through-holes are not limited insofar as the second through-holes are less wide than the element region, but two or more second through-holes are preferably formed in the width direction with respect to each element region. In the case where two or more second through-holes are formed, the through-holes are preferably formed at equal intervals.

Note that if the per-hole width of the second through-holes is too small, it is difficult to fill the sealant in a step described later. On the other hand, if the ratio of the total widths of the second through-holes with respect to the width of the element region is too large, the ratio of the valve-action metal substrate exposed on the end face of the solid electrolytic capacitor will be too small, and the ESR will increase easily.

[Step (B)]

In step (B), the second sheet is prepared.

The second sheet contains the metal foil.

The second sheet contains a plurality of element regions, in which each element region is partitioned by a first end part and a second end part which oppose each other in the length direction, and by a first side part and a second side part which oppose each other in the width direction. Furthermore, in the second sheet, one or more third through-holes less wide than each element region are formed straddling the first end part of each element region, while in addition, a fourth through-hole as wide or wider than each element region is formed straddling the second end part of each element region.

Figure 6A:
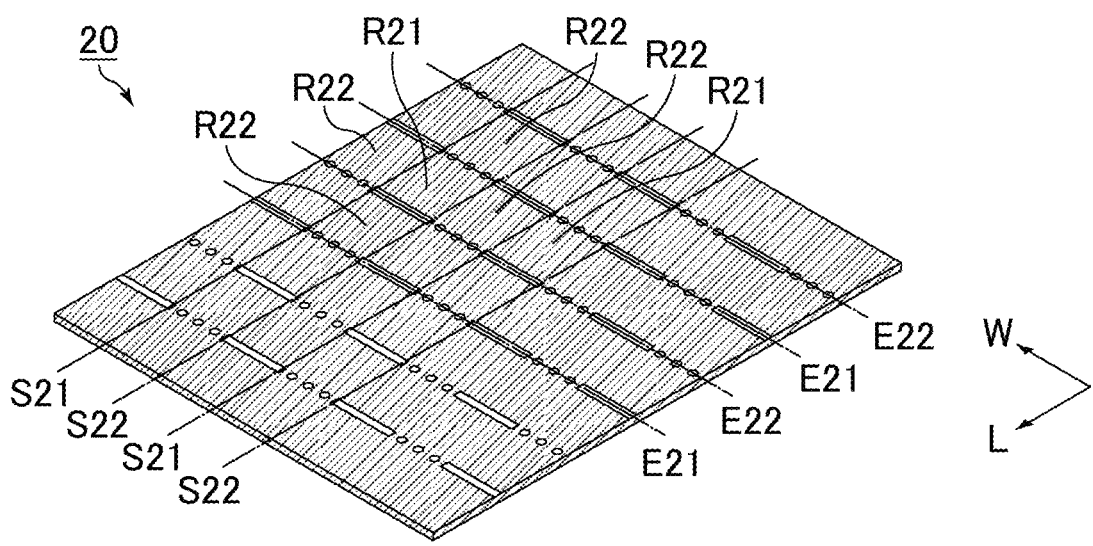
Figure 6B:
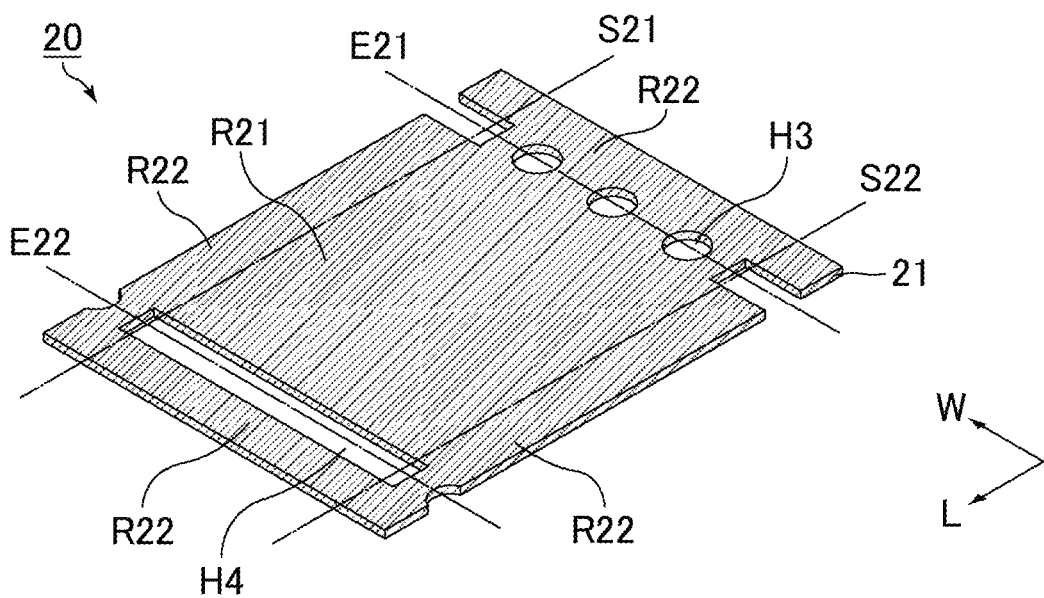
FIG. 6B is an enlarged perspective view of a portion of FIG. 6A.

FIG. 6A is a perspective view schematically illustrating an example of the second sheet, while FIG. 6B is an enlarged perspective view of a portion of FIG. 6A.

A second sheet 20 illustrated in FIGS. 6A and 6B includes a plurality of element regions R21 (hereinafter referred to as first element regions) and a plurality of element regions R22 (hereinafter referred to as second element regions).

As illustrated in FIG. 6B, the first element regions R21 are partitioned by a first end part E21 and a second end part E22 which oppose each other in the length direction (L direction), and by a first side part S21 and a second side part S22 which oppose each other in the width direction (W direction) orthogonal to the length direction described above. Furthermore, a plurality of third through-holes H3 (three in FIG. 6B) are formed straddling the first end parts E21 of the first element regions R21 in the length direction, while in addition, a single fourth through-hole H4 is formed straddling the second end parts E22 of the first element regions R21 in the length direction. The third through-holes H3 are multiple approximately round holes less wide than one of the first element regions R21, while the fourth through-hole H4 is a single long hole as wide or wider than the one of the first element regions R21.

On the other hand, the second element regions R22 have the same shape as the first element regions R21, but the directions of the first end part E21 and the second end part E22 are the reverse of the first element regions R21.

As illustrated in FIG. 6A, in the second sheet 20, the first element regions R21 and the second element regions R22 are disposed alternately in the length direction. As illustrated in FIG. 6B, each first element region R21 shares the first end part E21 and the third through-holes H3 with an adjacent second element region R22, while also sharing the second end part E22 and the fourth through-hole H4 with another adjacent second element region R22.

Furthermore, as illustrated in FIG. 6A, in the second sheet 20, the first element regions R21 and the second element regions R22 are disposed alternately in the width direction. As illustrated in FIG. 6B, each first element region R21 shares the first side part S21 with an adjacent second element region R22, while also sharing the second side part S22 with another adjacent second element region R22.

The second sheet is preferably made as follows.

First, the metal foil 21 is prepared.

The metal foil preferably contains at least one metal selected from the group consisting of aluminum, copper, silver, and alloys primarily made of these metals.

If the metal foil contains any of the above metals, the resistance of the metal foil can be lowered, and the ESR can be lowered.

Additionally, a metal foil having a carbon coat or a titanium coat formed on the surface by a film deposition method such as sputtering or vapor deposition may be used as the metal foil.

The thickness of the metal foil is not limited, but from the perspective of lowering the ESR, the thickness of the metal foil is preferably 5 μm to 100 μm.

The surface of the metal foil is preferably roughened.

Roughening the surface of the metal foil improves the adhesion between the metal foil and the conductive adhesive layer as well as the adhesion between the metal foil and the insulating adhesive layer, and therefore the ESR can be lowered.

The method of roughening the surface is not limited, but a roughened surface may be formed by etching or the like. In the case of using aluminum in particular, applying a carbon coat or a titanium coat to a roughened (etched) surface is preferable for lowering the resistance.

In addition, a coat layer containing an anchor coating agent may also be formed on the surface of the metal foil.

Forming a coat layer containing an anchor coating agent on the surface of the metal foil improves the adhesion between the metal foil and the solid electrolyte layer or the adhesion between the metal foil and the other conductor layer, and therefore the ESR can be lowered.

Next, the third through-holes H3 are formed straddling the first end part E21 of each element region, while in addition, the fourth through-hole H4 is formed straddling the second end part E22 of each element region.

The third through-holes and the fourth through-hole are formed by laser processing, etching, or punching, for example.

The overall size of the second sheet is not limited, but is preferably the same as the overall size of the first sheet. The shape, number, and arrangement of the element regions in the second sheet are preferably the same as the shape, number, and arrangement of the element regions in the opposing first sheet.

From the perspective of manufacturing efficiency, the second sheet contains a plurality of element regions. In particular, the second sheet contains the first element regions and the second element regions, with the first element regions and the second element regions preferably being disposed alternately in the length direction, and more preferably disposed alternately in the width direction as well. In the case where the first element regions and the second element regions are disposed alternately, the fourth through-hole is not unevenly distributed in the width direction of the second sheet, and therefore the sheet strength is not lowered as much.

In the second sheet, in the case where the first element regions and the second element regions are disposed alternately in the length direction, each first element region preferably shares the first end part and the third through-holes with an adjacent second element region, while also sharing the second end part and the fourth through-hole with another adjacent second element region. In this case, the number of cuts for dividing the element regions and the portions to dispose of can be reduced.

However, in the case where the second sheet contains the first element regions and the second element regions, the first element regions and the second element regions do not have to be disposed alternately in the length direction or the width direction. Also, in the case where the first element regions and the second element regions are disposed alternately in the length direction, each first element region does not have to share the first end part and the third through-holes with an adjacent second element region, and does not have to share the second end part and the fourth through-hole with another adjacent second element region. Furthermore, in the case where the first element regions and the second element regions are disposed alternately in the width direction, each first element region does not have to share the first side part with an adjacent second element region, and does not have to share the second side part with another adjacent second element region.

Features such as the shape, number, and arrangement of the third through-holes are not limited insofar as the third through-holes are less wide than the element region, but two or more third through-holes are preferably formed in the width direction with respect to each element region. In the case where two or more third through-holes are formed, the through-holes are preferably formed at equal intervals.

Note that if the per-hole width of the third through-holes is too small, it is difficult to fill the sealant in a step described later. On the other hand, if the ratio of the total widths of the third through-holes with respect to the width of the element region is too large, the ratio of the metal foil exposed on the end face of the solid electrolytic capacitor will be too small, and the ESR will increase easily.

The shape of the fourth through-hole is not limited insofar as the fourth through-hole is as wide or wider than the element region.

[Step (C)]

In step (C), the insulating adhesive layer is formed on the first and second end parts and the first and second side parts of each element region in the first sheet and/or the second sheet, while in addition, the notched part, which is a region where the insulating adhesive layer is not formed, is formed straddling the first end part and/or the second end part of each element region in the first sheet, and/or the first end part and/or the second end part of each element region in the second sheet.

The method of forming the insulating adhesive layer provided with the notched part may be a method such as forming the insulating adhesive layer on all of the first end parts, the second end parts, the first side parts, and the second side parts of the element regions, and then removing a portion of the insulating adhesive layer, or a method of forming the insulating adhesive layer in a shape such that the notched part is already provided, for example.

The method of forming the insulating adhesive layer on the first sheet and/or the second sheet may be a method such as inkjet printing or silkscreen printing.

The method of removing a portion of the insulating adhesive layer may be a method such as laser processing, for example. Additionally, the insulating adhesive layer may also be provided in a form such that the notched part already exists.

An example of the case of forming the insulating adhesive layer on the first sheet will be described with reference to FIGS. 7A and 7B.

Figure 7A:
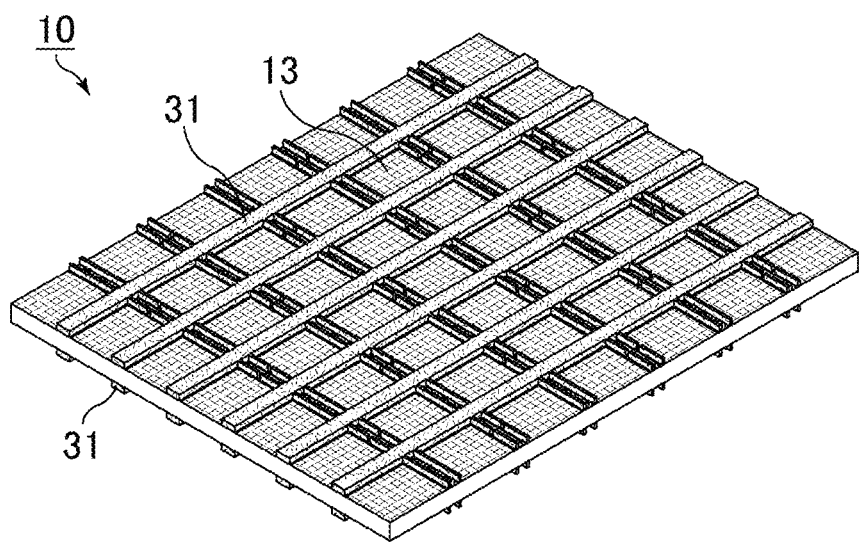
Figure 7B:
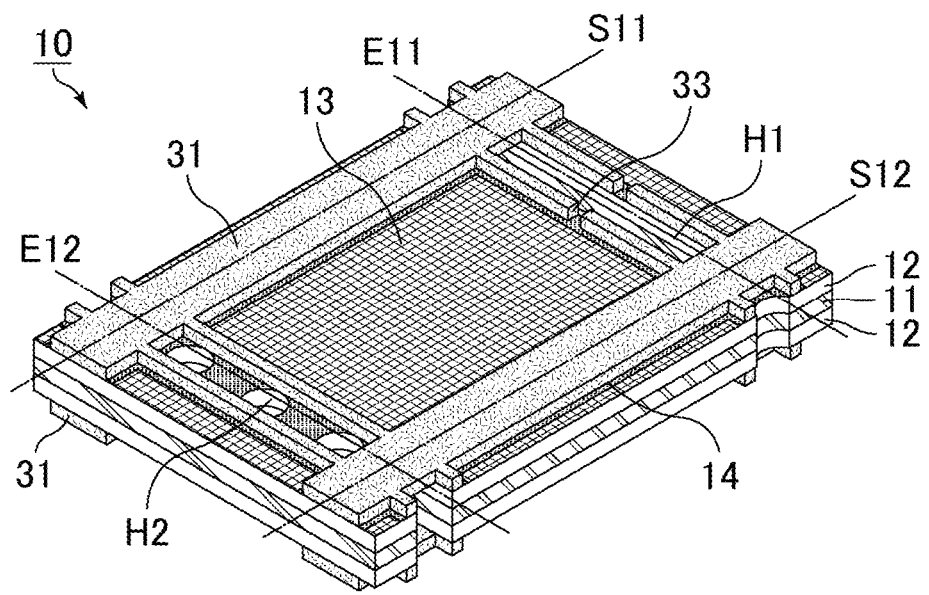
FIG. 7B is an enlarged perspective view of a portion of FIG. 7A.

FIG. 7A is a perspective view schematically illustrating an example of the first sheet provided with the insulating adhesive layer, while FIG. 7B is an enlarged perspective view of a portion of FIG. 7A.

In FIGS. 7A and 7B, the insulating adhesive layer 31 is provided on the mask layer 14 of the first sheet 10 illustrated in FIGS. 5A and 5B.

The insulating adhesive layer 31 is provided on an outer portion of each element region, and a space where the conductive adhesive layer is to be disposed is provided in an inner portion. Furthermore, a region where the insulating adhesive layer 31 is not provided, namely the notched part 33, is provided in a portion bordering the first end part E11.

Note that the notched part may also be provided obliquely along a direction inclined from the shortest direction connecting the first end part E11 and the element region (the direction in which the length of the notched part is the shortest).

In the case where the mask layer has been formed on the first sheet in step (B), the insulating adhesive layer is preferably formed on top of the mask layer in step (C).

On the other hand, in the case where the mask layer has not been formed on the first sheet in step (B), the insulating adhesive layer may be formed on the surface of the dielectric layer in step (C).

The insulating adhesive layer may have the same composition and viscosity as the mask layer, but preferably has a different composition and viscosity from the mask layer.

The combined height of the mask layer and the insulating adhesive layer in the thickness direction may be the same as the height of the solid electrolyte layer in the thickness direction, but is preferably taller than the height of the solid electrolyte layer in the thickness direction.

In step (C), a conductor layer additionally may be formed on the solid electrolyte layer.

Figure 8A:
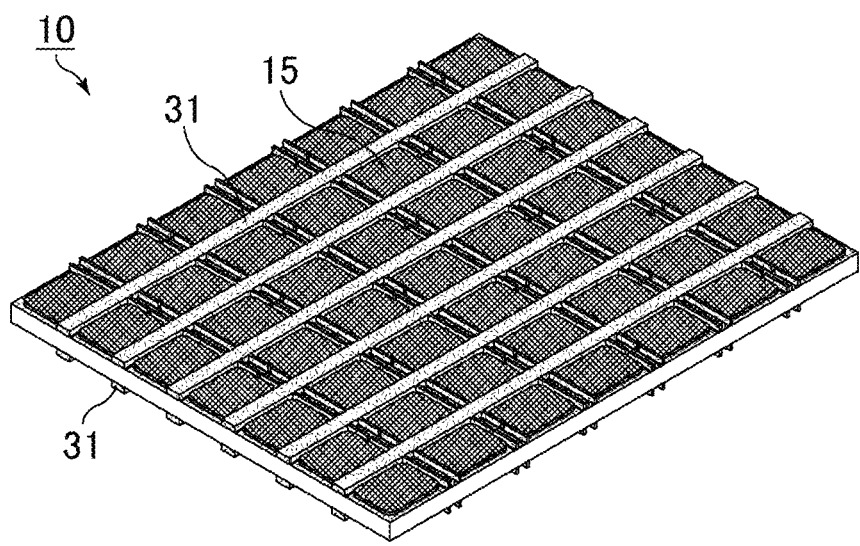
Figure 8B:
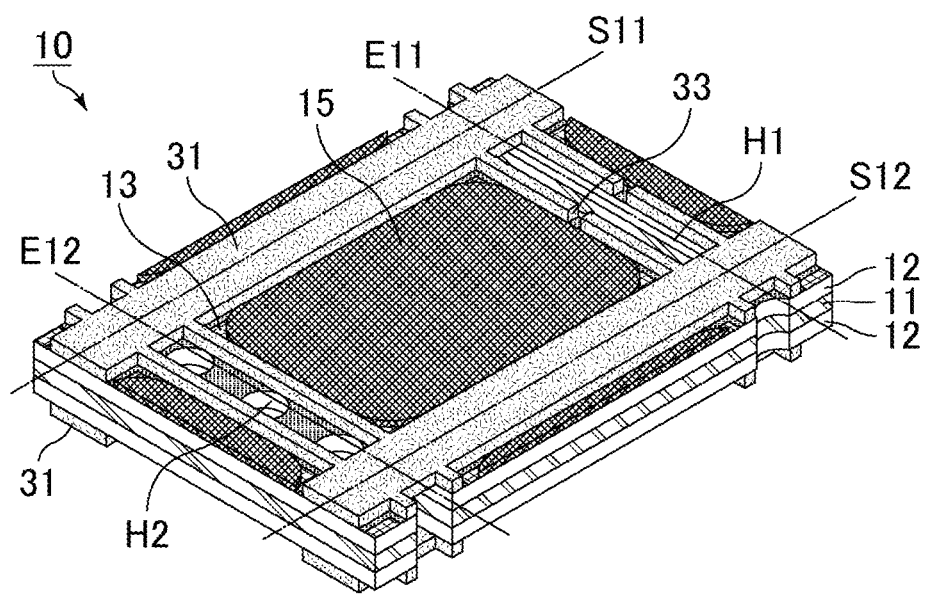
FIG. 8B is an enlarged perspective view of a portion of FIG. 8A.

FIG. 8A is a perspective view schematically illustrating an example of the first sheet provided with the conductor layer, while FIG. 8B is an enlarged perspective view of a portion of FIG. 8A.

In FIGS. 8A and 8B, the conductor layer 15 is provided on the solid electrolyte layer 13 of the first sheet 10 illustrated in FIGS. 7A and 7B.

The conductor layer preferably contains a carbon layer only, but may also contain a silver layer only, or the conductor layer may be dual-layered containing a carbon underlayer with a silver layer on top. The carbon layer and the silver layer can be provided by respectively applying carbon paste and silver paste, for example.

[Step (D)]

In step (D), the conductive adhesive layer is formed on the solid electrolyte layer of the first sheet and/or the surface of the second sheet. Note that in the case where the conductor layer has been formed on the solid electrolyte layer of the first sheet, the conductive adhesive layer may be formed on the conductor layer.

An example of the case of forming the conductive adhesive layer on the first sheet will be described with reference to FIGS. 9A and 9B.

Figure 9A:
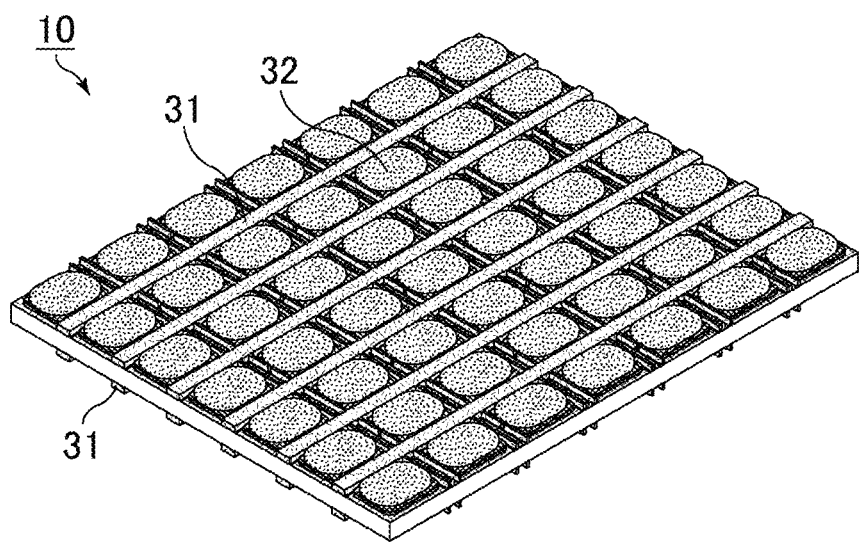
Figure 9B:
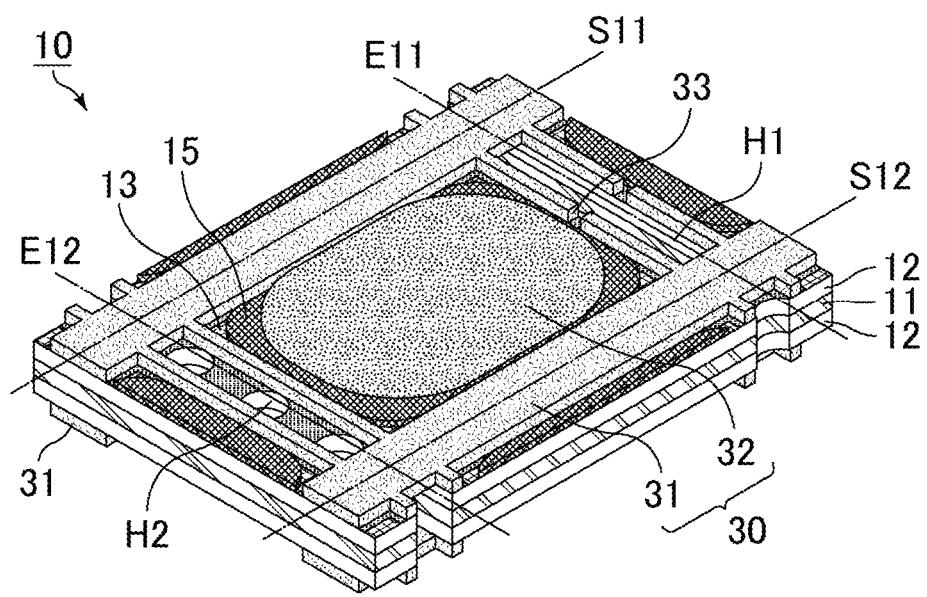
FIG. 9B is an enlarged perspective view of a portion of FIG. 9A.

FIG. 9A is a perspective view schematically illustrating an example of the first sheet provided with the conductive adhesive layer, while FIG. 9B is an enlarged perspective view of a portion of FIG. 9A.

In FIGS. 9A and 9B, the conductive adhesive layer 32 is provided on the conductor layer 15 of the first sheet 10 illustrated in FIGS. 8A and 8B.

The insulating adhesive layer 31 is provided surrounding the outer perimeter of the conductive adhesive layer 32, and the notched part 33 is provided near the first through-hole H1 (that is, on the cathode side).

[Step (E)]

In step (E), the first sheet and the second sheet are stacked to make a laminated sheet.

At this time, the first sheet and the second sheet are stacked such that the first end parts and the second end parts of the element regions respectively oppose each other, such that the insulating adhesive layer surrounds the outer perimeter of the conductive adhesive layer in each element region, and also such that the first through-hole communicates with the third through-holes and the second through-holes communicate with the fourth through-hole in the laminating direction.

The insulating adhesive layer and the conductive adhesive layer may be formed on the same sheet or on different sheets.

For example, in the case where the insulating adhesive layer and the conductive adhesive layer are provided on different sheets, it is necessary to align the positions of the first sheet and the second sheet such that the insulating adhesive layer surrounds the outer perimeter of the conductive adhesive layer.

On the other hand, as illustrated in FIG. 9B, in the case where the insulating adhesive layer 31 and the conductive adhesive layer 32 are provided on the same sheet, the insulating adhesive layer is already provided surrounding the outer perimeter of the conductive adhesive layer, and therefore positional alignment is not particularly necessary.

Figure 10A:
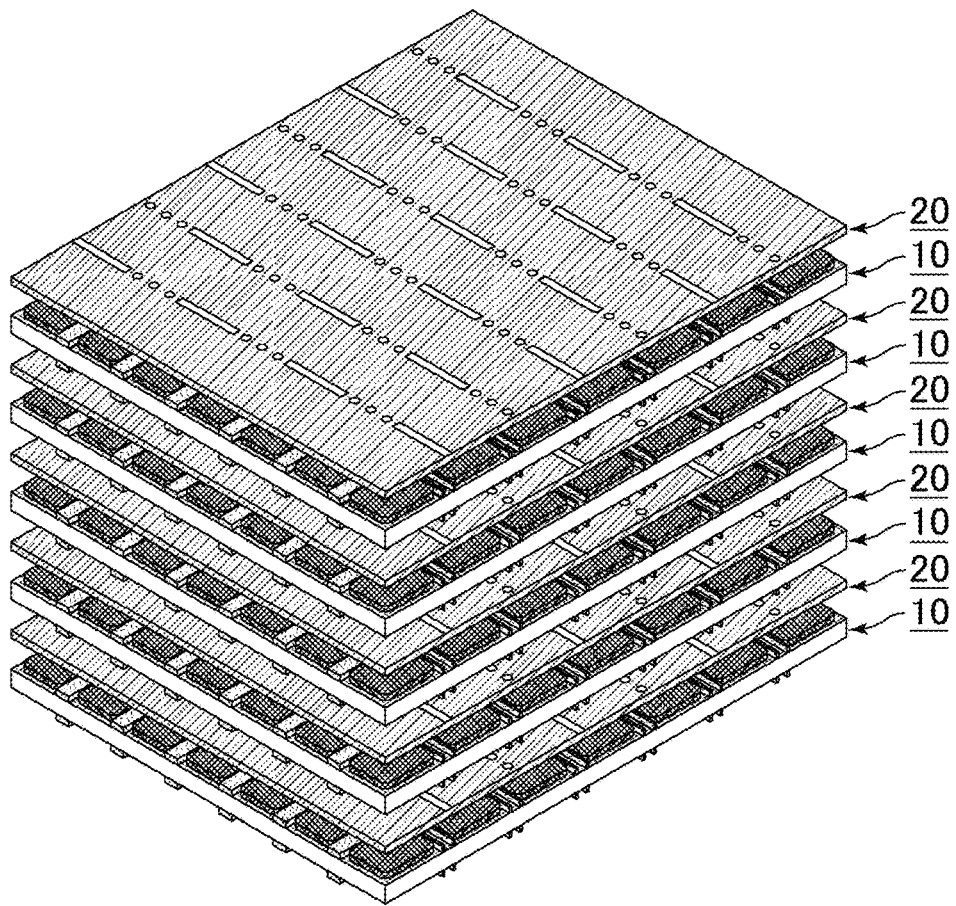
Figure 10B:
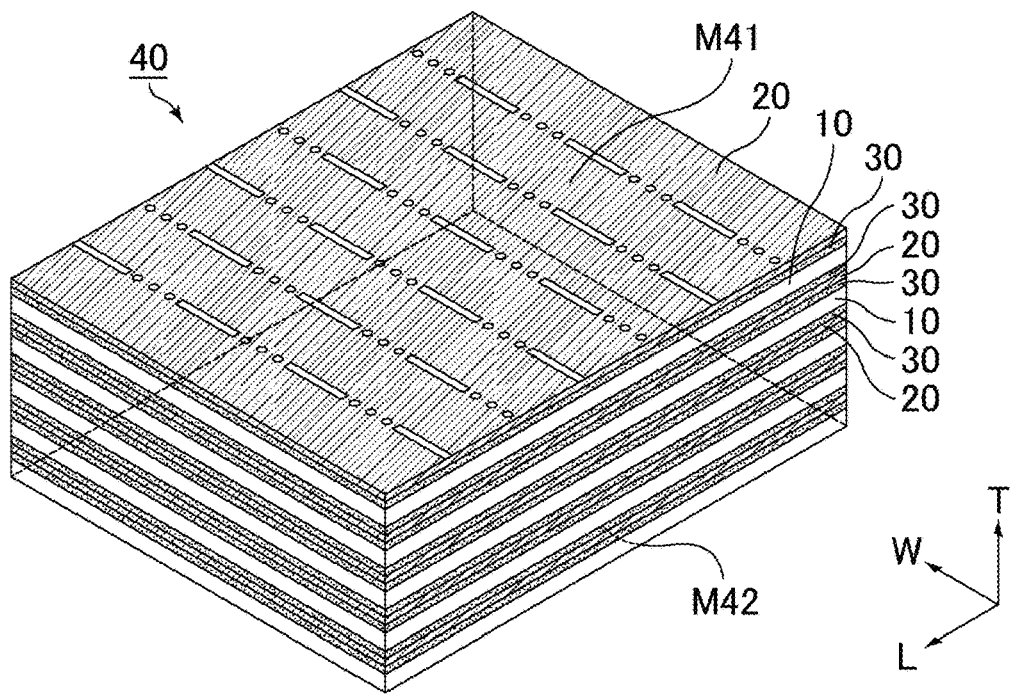
FIG. 10B is a perspective view schematically illustrating an example of a laminated sheet.

FIG. 10A is a perspective view schematically illustrating an example of a state before laminating the first sheets and the second sheets, while FIG. 10B is a perspective view schematically illustrating an example of the laminated sheet.

As illustrated in FIG. 10A, by disposing the first sheet 10 and the second sheet 20 alternately, a laminated sheet 40 illustrated in FIG. 10B is obtained. The laminated sheet 40 has a first main surface M41 and a second main surface M42 which oppose each other in the laminating direction (T direction).

Adhesive layers 30 are disposed between the first sheets 10 and the second sheets 20.

FIGS. 10A and 10B illustrate an example in which five each of the first sheet 10 and the second sheet 20 are laminated, with one of the second sheets 20 acting as the first main surface M41 and one of the first sheets 10 acting as the second main surface M42 of the laminated sheet 40, but the number of first sheets and second sheets to laminate is not limited. Also, the number of first sheets and the number of second sheets may be the same or different. Consequently, either of the first sheet and the second sheet may be disposed on the main surfaces of the laminated sheet. Also, when making the laminated sheet, the first sheets and the second sheets may be stacked on top of a substrate containing a glass epoxy resin or the like.

Note that in FIGS. 7A and 7B, a procedure of providing the insulating adhesive layer 31 on the first sheet 10 is described, but in addition to or instead of the step illustrated in FIGS. 7A and 7B, a step of providing the insulating adhesive layer 31 on the second sheet 20 illustrated in FIGS. 6A and 6B may be performed.

In the case of providing the insulating adhesive layer on both the first sheet and the second sheet, it is sufficient to provide the notched part in at least one of the insulating adhesive layer provided on the first sheet or the insulating adhesive layer provided on the second sheet.

Also, in FIGS. 9A and 9B, a procedure of providing the conductive adhesive layer 32 on the conductor layer 15 of the first sheet 10 is described, but in addition to or instead of the step illustrated in FIGS. 9A and 9B, a step of providing the conductive adhesive layer 32 on the second sheet 20 illustrated in FIGS. 6A and 6B may be performed.

[Step (F)]

In step (F), a laminated block is made by respectively filling the first and third through-holes as well as the second and fourth through-holes with a sealant from at least one of the first main surface or the second main surface which oppose each other in the laminating direction of the laminated sheet.

Figure 11A:
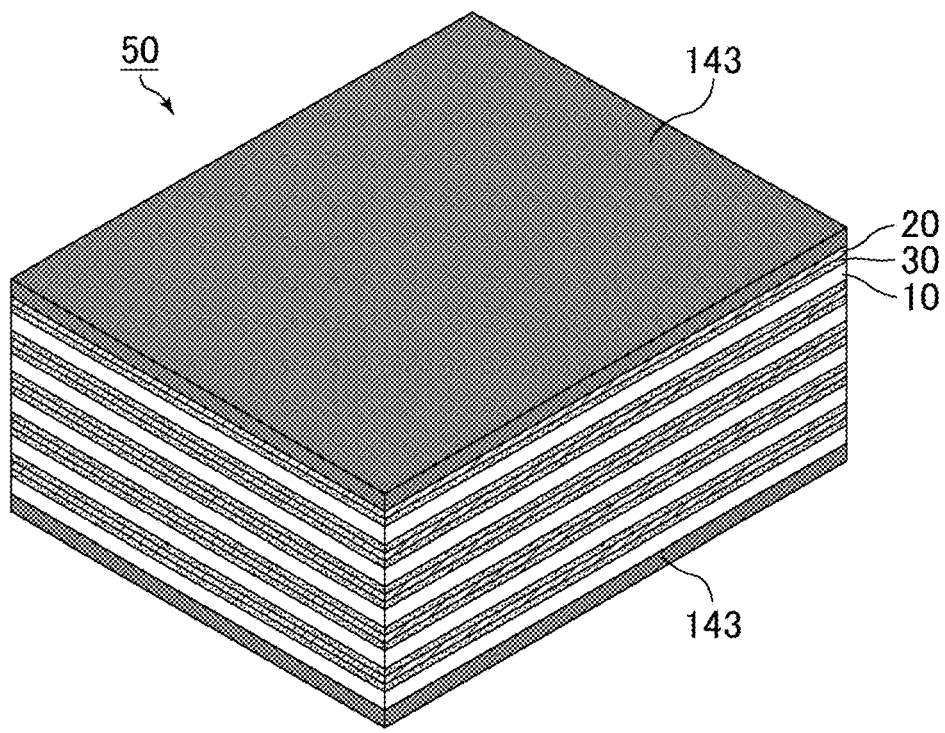
Figure 11B:
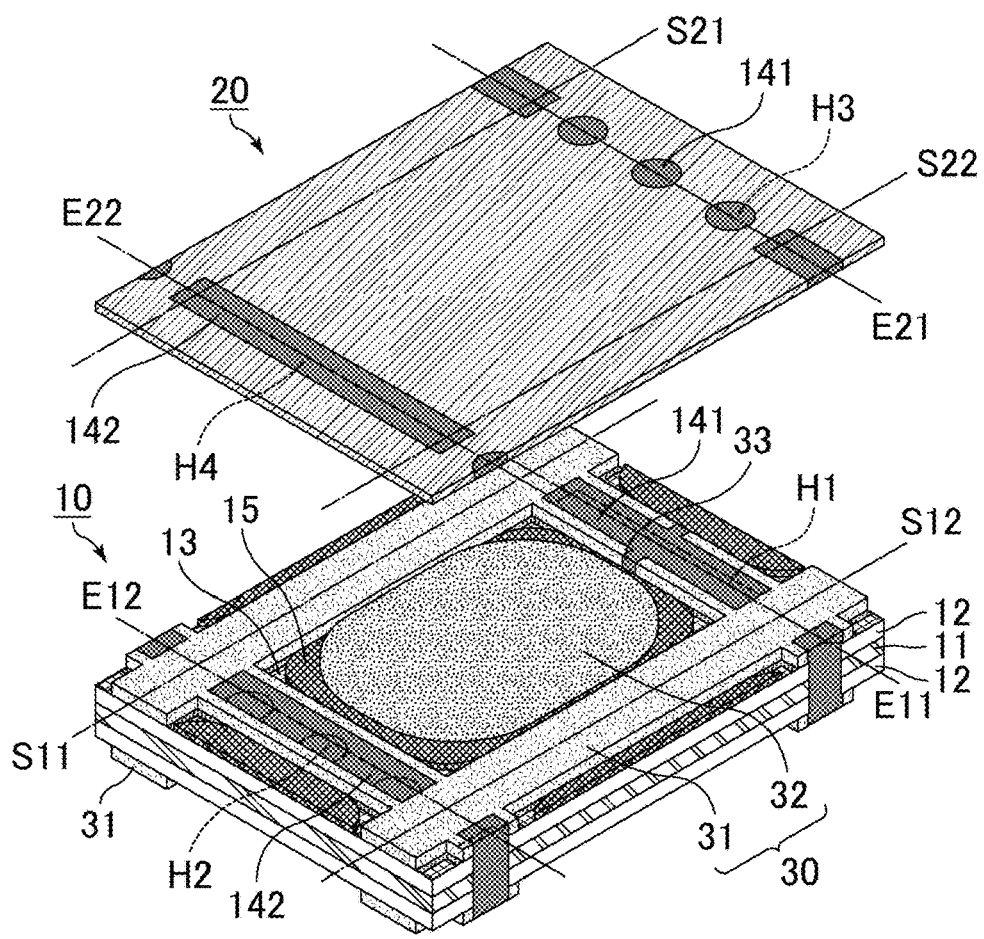
FIG. 11B is an exploded and enlarged perspective view of a portion of FIG. 11A.

FIG. 11A is a perspective view schematically illustrating an example of the laminated block, while FIG. 11B is an exploded and enlarged perspective view of a portion of FIG. 11A.

In a laminated block 50 illustrated in FIG. 11A, by respectively filling the first and third through-holes as well as the second and fourth through-holes with the sealant, the first sealing part 141 filling the first through-hole H1 and the third through-holes H3 as well as the second sealing part 142 filling the second through-holes H2 and the fourth through-hole H4 are formed, as illustrated in FIG. 11B. Also, as illustrated in FIG. 11A, the laminated block 50 is additionally provided with a third sealing part 143 that covers each of the main surfaces.

Note that although the notched part 33 is filled by the first sealing part 141 in FIG. 11B, the notched part 33 does not have to be filled with the sealant.

The sealant contains at least a resin, and preferably contains a resin and a filler.

The resin contained in the sealant may be an epoxy resin or a phenol resin, for example. Also, the filler contained in the sealant may be silica particles, alumina particles, or metal particles, for example.

In the case where the sealant contains a resin and a filler, the maximum diameter of the filler is preferably smaller than the minimum diameter of the second through-holes and the third through-holes to ensure the filling ability of the sealant.

Note that the diameter of a through-hole refers to the geometric diameter in the case where the through-hole has a circular cross-section, and refers to the maximum length passing through the center of the cross-section in the case where the through-hole has a non-circular cross-section.

Also, in the case where the sealant contains a resin and a filler, the maximum diameter of the filler is preferably smaller than the minimum thickness of the metal foil to ensure the filling ability of the sealant.

The maximum diameter of the filler contained in the sealant is preferably in a range from 30 μm to 40 μm, for example.

[Step (G)]

In step (G), the laminated block is cut at the positions of the first end part and the second end part of each element region such that the sealing parts in which the through-holes are filled with sealant are separated on either side.

By cutting the laminated block at the positions of the first end part and the second end part of each element region, and also cutting the laminated block at the positions of the first side part and the second side part of each element region, a plurality of element laminates are made.

Figure 12A:
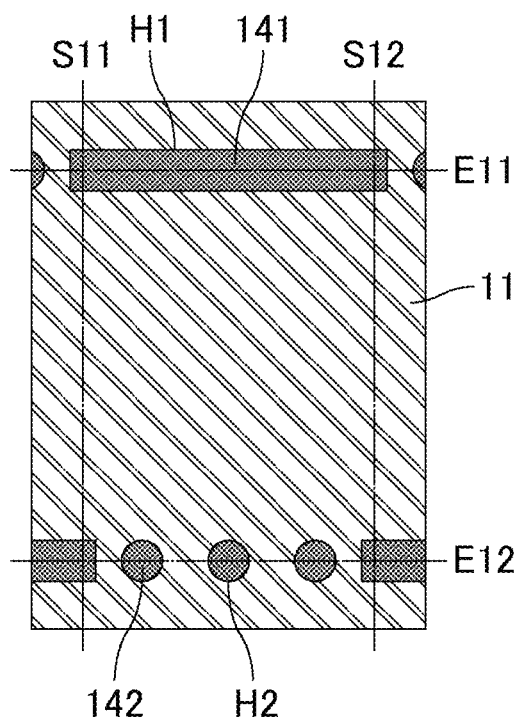
Figure 12B:
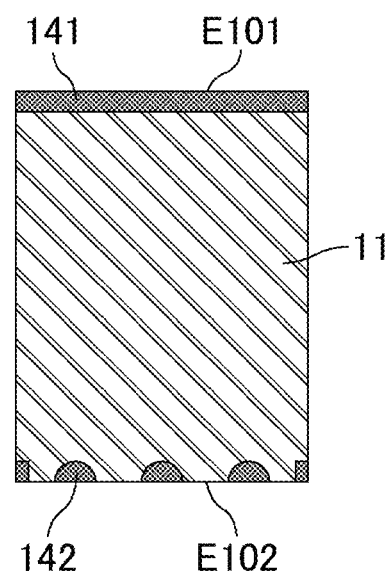
FIG. 12B is a plan view schematically illustrating the valve-action metal substrate after cutting.

FIG. 12A is a plan view schematically illustrating the valve-action metal substrate before cutting, while FIG. 12B is a plan view schematically illustrating the valve-action metal substrate after cutting.

As illustrated in FIG. 12A, on the valve-action metal substrate 11 forming the first sheet included in the laminated block, the first sealing part 141 filling the first through-hole H1 that straddles the first end part E11 of each element region and the second sealing part 142 filling the second through-holes H2 that straddle the second end part E12 of each element region are formed.

Consequently, if the valve-action metal substrate 11 is cut by dicing or the like such that the first sealing part 141 and the second sealing part 142 are separated on either side at the positions of the first end part E11 and the second end part E12 of each element region, as illustrated in FIG. 12B, on the cut face of the first end part E11, namely the first end face E101, the first sealing part 141 is exposed, but the valve-action metal substrate 11 is not exposed. On the other hand, on the cut face of the second end part E12, namely the second end face E102, the valve-action metal substrate 11 and the second sealing part 142 are exposed.

Also, if the valve-action metal substrate 11 is cut by dicing or the like at the positions of the first side part S11 and the second side part S12 of each element region, as illustrated in FIG. 12B, the valve-action metal substrate 11 is exposed on both of the cut faces.

Figure 13A:
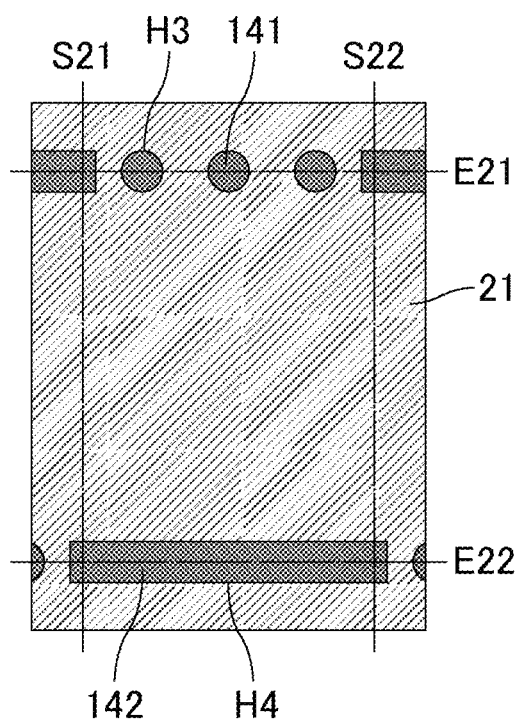
Figure 13B:
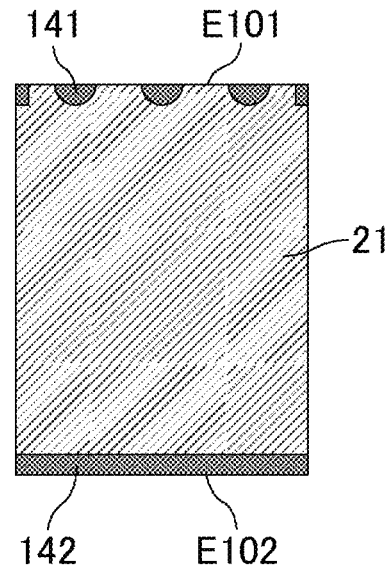
FIG. 13B is a plan view schematically illustrating the metal foil after cutting.

FIG. 13A is a plan view schematically illustrating the metal foil before cutting, while FIG. 13B is a plan view schematically illustrating the metal foil after cutting.

As illustrated in FIG. 13A, on the metal foil 21 forming the second sheet included in the laminated block, the first sealing part 141 filling the third through-holes H3 that straddle the first end part E21 of each element region and the second sealing part 142 filling the fourth through-hole H4 that straddles the second end part E22 of each element region are formed.

Consequently, if the metal foil 21 is cut by dicing or the like such that the first sealing part 141 and the second sealing part 142 are separated on either side at the positions of the first end part E21 and the second end part E22 of each element region, as illustrated in FIG. 13B, on the cut face of the first end part E21, namely the first end face E101, the metal foil 21 and the first sealing part 141 are exposed. On the other hand, on the cut face of the second end part E22, namely the second end face E102, the second sealing part 142 is exposed, but the metal foil 21 is not exposed.

Also, if the metal foil 21 is cut at the positions of the first side part S21 and the second side part S22 of each element region, as illustrated in FIG. 13B, the metal foil 21 is exposed on both of the cut faces.

As above, by cutting the laminated block at the positions of the first end part and the second end part of each element region, the metal foil and the first sealing part can be exposed on the first end face of the obtained element laminates, while the valve-action metal substrate and the second sealing part can be exposed on the second end face of the obtained element laminates.

Also, because both the metal foil and the valve-action metal substrate are exposed on the cut faces obtained by cutting the laminated block at the positions of the first side part and the second side part of each element region, it is preferable to form the fourth sealing part that covers each side face of the element laminates.

The element laminates are preferably made as follows.

First, the laminated block is cut along the first side part and the second side part of each element region. To cut the laminated block, a method such as dicing using a dicer is applied, for example.

Figure 14A:
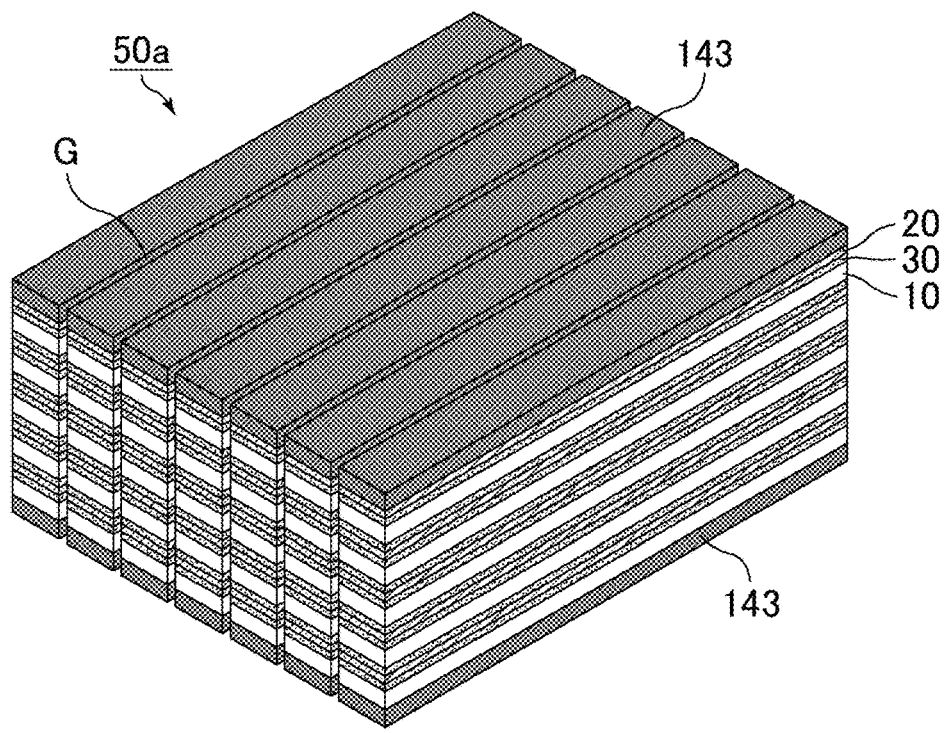
Figure 14B:
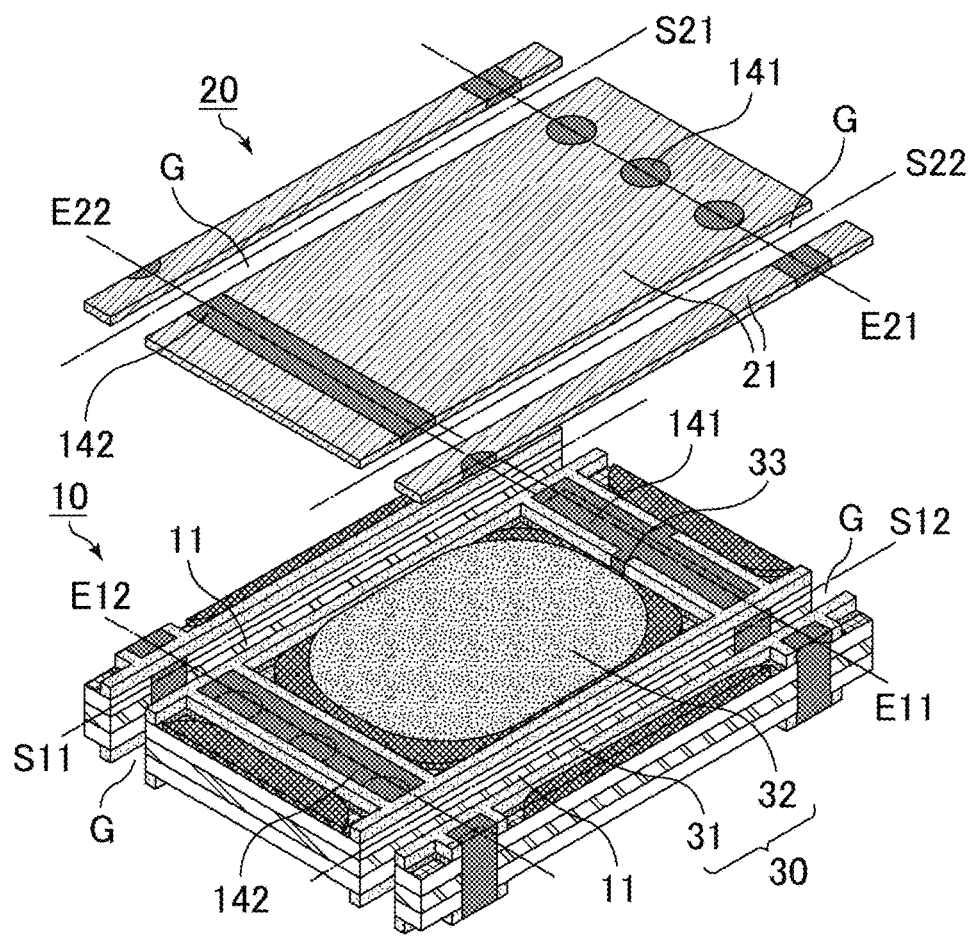
FIG. 14B is an exploded and enlarged perspective view of a portion of FIG. 14A.

FIG. 14A is a perspective view schematically illustrating an example of the laminated block after being cut, while FIG. 14B is an exploded and enlarged perspective view of a portion of FIG. 14A.

For example, by cutting the laminated block 50 illustrated in FIG. 11A along the first side part and the second side part of each element region, a laminated block 50a in which gaps G are formed along the first side parts and the second side parts is made, as illustrated FIGS. 14A and 14B. As illustrated in FIG. 14B, in the laminated block 50a, the metal foil 21, the insulating adhesive layer 31, and the valve-action metal substrate 11 are exposed on the cut side face produced by the cutting. Although not illustrated, the thickness (thickness in the T direction) of the exposed parts of the metal foil 21 and the valve-action metal substrate 11 is large compared to the thickness of the internal metal foil 21 and valve-action metal substrate 11 which are not exposed, with the thickness tapering up and down in the thickness direction.

Next, the gaps formed in the laminated block are filled with a sealant. With this arrangement, the fourth sealing part filling the gaps is formed. The sealant used at this point may be the sealant for forming first sealing part and the second sealing part, for example.

Figure 15A:
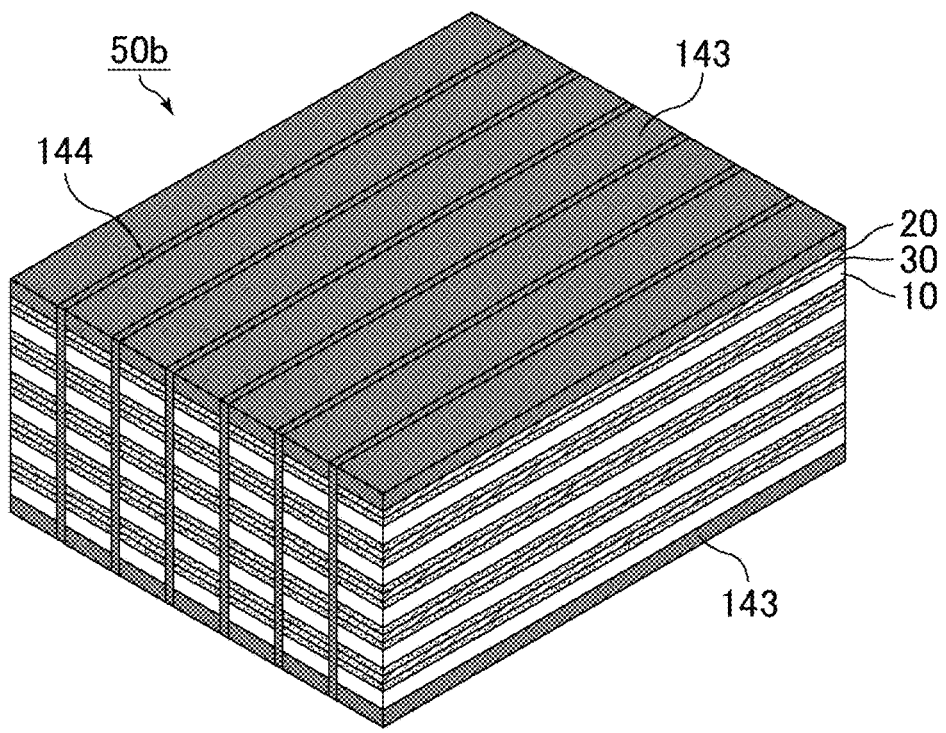
Figure 15B:
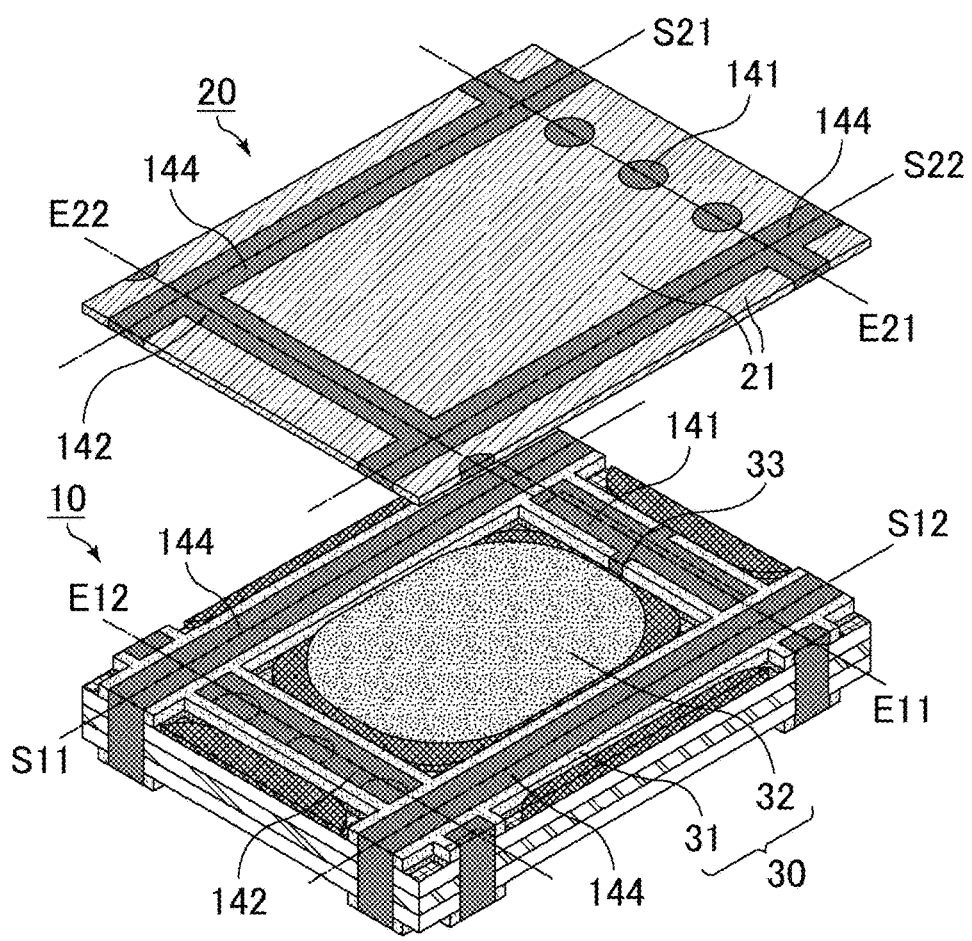
FIG. 15B is an exploded and enlarged perspective view of a portion of FIG. 15A.

FIG. 15A is a perspective view schematically illustrating an example of the laminated block in which the fourth sealing part is formed, while FIG. 15B is an exploded and enlarged perspective view of a portion of FIG. 15A.

By filling the gaps G of the laminated block 50a illustrated in FIG. 14A with the sealant, a laminated block 50b in which the fourth sealing part 144 filling the gaps G is formed is made, as illustrated in FIGS. 15A and 15B.

After that, the laminated block is cut such that the first sealing part 141 and the second sealing part 142 are separated on either side at the positions of the first end part and the second end part of each element region, and is also cut such that the fourth sealing part 144 is separated on either side at the positions of the first side part and the second side part of each element region. With this arrangement, element laminates insulated by the first side part and the second side part are diced. To cut the laminated block, a method such as dicing using a dicer, a cutting blade, laser processing, or scribing is applied, for example. Note that in the case of stacking the first sheets and the second sheets on a substrate containing a glass epoxy resin or the like, it is preferable to cut down to a half-cut position of the substrate in order to reliably cut the second sheets containing the metal foil.

Figure 16A:
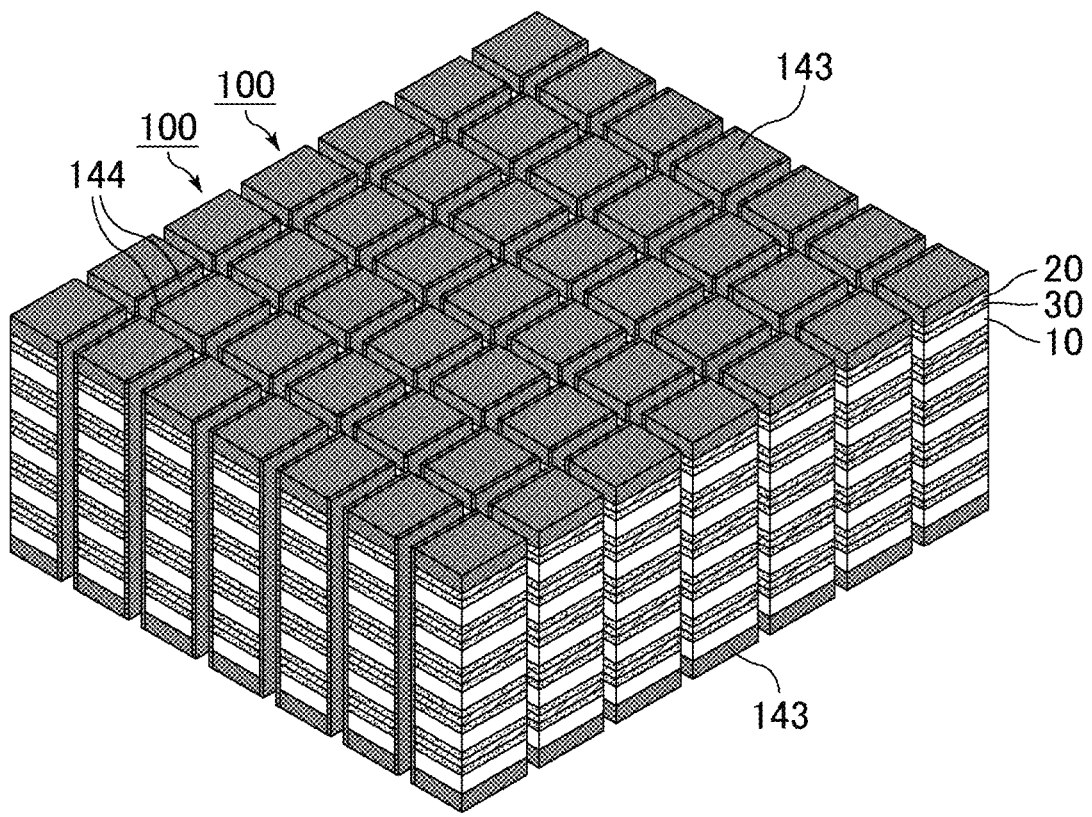
Figure 16B:
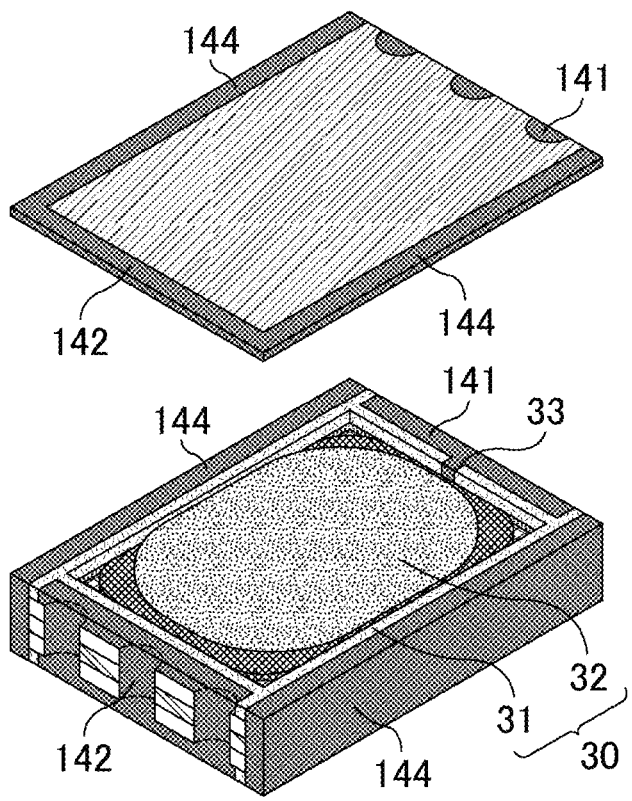
FIG. 16B is an exploded and enlarged perspective view of a portion of FIG. 16A.

FIG. 16A is a perspective view schematically illustrating an example of the diced element laminates, while FIG. 16B is an exploded and enlarged perspective view of a portion of FIG. 16A.

By cutting the laminated block 50b illustrated in FIG. 15A at the positions of the first end part and the second end part of each element region, and also cutting the laminated block 50b at the positions of the first side part and the second side part of each element region, the element laminates 100 illustrated in FIG. 16A are obtained. At this point, as illustrated in FIGS. 16A and 16B, the laminated block 50b is cut such that the cut side faces produced by cutting at the positions of the first side part and the second side part are covered by the fourth sealing part 144.

[Step (H)]

In step (H), of the first end face and the second end face which oppose each other in the length direction of each element laminate, the first external electrode is formed on the first end face, and the second external electrode is formed on the second end face.

The first external electrode is formed on the first end face while the second external electrode is formed on the second end face of each obtained element laminate. By the above, the solid electrolytic capacitor according to the present invention is obtained.

The first external electrode is connected to the metal foil and therefore acts as the cathode.

The second external electrode is connected to the valve-action metal substrate and therefore acts as the anode.

Note that in the method of manufacturing a solid electrolytic capacitor according to the present invention, the method of cutting the laminated sheets or the laminated block and the method of forming the first external electrode and the second external electrode on the element laminates are not limited.

In the method illustrated in FIGS. 5A to 16B, the insulating adhesive layer is formed on the first sheet, but the insulating adhesive layer may also be formed on the second sheet.

An example of a step of providing the insulating adhesive layer on the second sheet will be described with reference to FIGS. 17A and 17B.

Figure 17A:
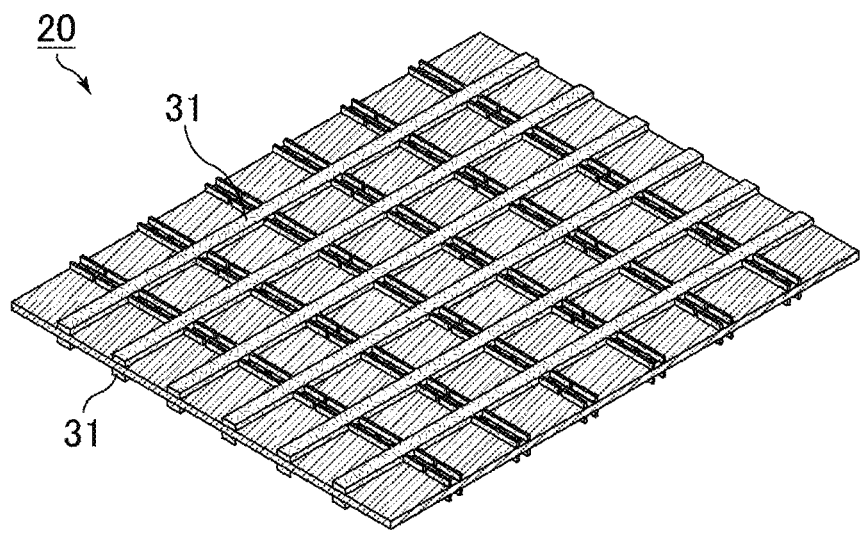
Figure 17B:
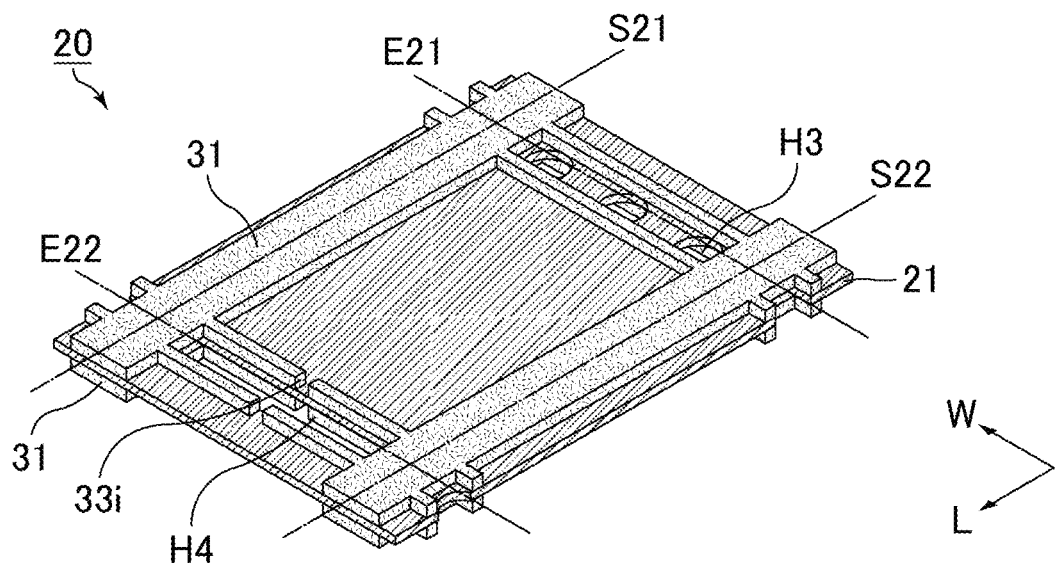
FIG. 17B is an enlarged perspective view of a portion of FIG. 17A.

FIG. 17A is a perspective view schematically illustrating an example of the second sheet provided with the insulating adhesive layer, while FIG. 17B is an enlarged perspective view of a portion of FIG. 17A.

As illustrated in FIGS. 17A and 17B, in step (C), the insulating adhesive layer 31 may be provided on the second sheet rather than the first sheet.

In the second sheet 20, a notched part 33i is provided on the side where the fourth through-hole H4 is provided (that is, on the anode side).

REFERENCE SIGNS LIST 1 solid electrolytic capacitor
10 first sheet
11 valve-action metal substrate
12 dielectric layer
13 solid electrolyte layer
14 mask layer
15 conductor layer
20 second sheet
21 metal foil
30 adhesive layer
31 insulating adhesive layer
32 conductive adhesive layer
33, 33a, 33b, 33c, 33d, 33e, 33f, 33g, 33h, 33i notched part
40 laminated sheet
50, 50a, 50b laminated block
100 element laminate
110 first layer
120 second layer
141 first sealing part
142 second sealing part
143 third sealing part
144 fourth sealing part
151 first external electrode
152 second external electrode
R11 first element region of first sheet
R12 second element region of first sheet
R21 first element region of second sheet
R22 second element region of second sheet
E11 first end part of element region in first sheet
E12 second end part of element region in first sheet
E21 first end part of element region in second sheet
E22 second end part of element region in second sheet
E101 first end face of element laminate
E102 second end face of element laminate
S11 first side part of element region in first sheet
S12 second side part of element region in first sheet
S21 first side part of element region in second sheet
S22 second side part of element region in second sheet
M41 first main surface of laminated sheet
M42 second main surface of laminated sheet
H1 first through-hole
H2 second through-hole
H3 third through-hole
H4 fourth through-hole
G gap in laminated block

The invention claimed is:

1. A solid electrolytic capacitor comprising:
an element laminate having a first end face and a second end face opposing each other in a length direction thereof, the element laminate including:
a first layer having a valve-action metal substrate, a dielectric layer on a surface of the valve-action metal substrate, and a solid electrolyte layer on the dielectric layer, the valve-action metal substrate being exposed on the second end face;
a second layer containing a metal foil, the metal foil being exposed on the first end face;
an adhesive layer bonding the first layer and the second layer to each other, the adhesive layer containing a conductive adhesive layer and an insulating adhesive layer surrounding an outer perimeter of the conductive adhesive layer when viewing the element laminate from a lamination direction, and the adhesive layer having a notched part that extends from the first end face or the second end face to the conductive adhesive layer;
a first sealing part exposed on the first end face; and
a second sealing part exposed on the second end face;
a first external electrode on the first end face of the element laminate and conductively connected to the metal foil; and
a second external electrode on the second end face of the element laminate and conductively connected to the valve-action metal substrate.

2. The solid electrolytic capacitor according to claim 1, wherein the notched part is located in a region within 20% of a distance from a first apex to an adjacent second apex of a region surrounded by the insulating adhesive layer when viewing the element laminate from the laminating direction.

3. The solid electrolytic capacitor according to claim 1, wherein the notched part is in a plurality of locations.

4. The solid electrolytic capacitor according to claim 1, wherein the notched part is at a position extending from the first end face to the conductive adhesive layer.

5. The solid electrolytic capacitor according to claim 1, wherein the notched part extends along a direction inclined relative to the length direction.

6. The solid electrolytic capacitor according to claim 1, wherein a width of the notched part is 50 μm to 500 μm.

7. The solid electrolytic capacitor according to claim 1, wherein the notched part is filled with the first sealing part or the second sealing part.

8. The solid electrolytic capacitor according to claim 1, wherein the conductive adhesive layer includes a mixture of an insulating resin and conductive particles.

9. The solid electrolytic capacitor according to claim 8, wherein the insulating adhesive layer includes an insulating resin.

10. The solid electrolytic capacitor according to claim 1, wherein the insulating adhesive layer includes an insulating resin.

11. A method of manufacturing a solid electrolytic capacitor, the method comprising:
preparing a first sheet having a valve-action metal substrate, a dielectric layer on a surface thereof, and a solid electrolyte layer on the dielectric layer, the first sheet containing a plurality of first element regions, in which each first element region is partitioned by a first end part and a second end part which oppose each other in a length direction, and partitioned by a first side part and a second side part which oppose each other in a width direction;
forming a first through-hole as wide or wider than each first element region straddling the first end part of each first element region;
forming one or more second through-holes less wide than each first element region straddling the second end part of each first element region;
preparing a second sheet containing a metal foil, the second sheet containing a plurality of second element regions, in which each second element region is partitioned by a first end part and a second end part which oppose each other in a length direction, and portioned by a first side part and a second side part which oppose each other in a width direction;
forming one or more third through-holes less wide than each second element region straddling the first end part of each second element region; and
forming a fourth through-hole as wide or wider than each second element region straddling the second end part of each second element region;
forming an insulating adhesive layer on the first and second end parts and the first and second side parts of each of the first and/or second element regions of the first sheet and/or the second sheet, wherein the insulating adhesive layer is formed so as to have a notched part straddling the first end part and/or the second end part of each first element regions in the first sheet, and/or the first end part and/or the second end part of each second element region in the second sheet;
forming a conductive adhesive layer on the solid electrolyte layer of the first sheet and/or a surface of the second sheet such that the insulating adhesive layer surrounds an outer perimeter of the conductive adhesive layer;
making a laminated sheet by stacking the first sheet and the second sheet such that the first end parts and the second end parts of the first and second element regions respectively oppose each other, and such that the first through-hole communicates with the third through-holes and the second through-holes communicate with the fourth through-hole in a laminating direction;
making a laminated block by filling the first and third through-holes as well as the second and fourth through-holes with a first sealant from at least one of a first main surface or a second main surface which oppose each other in the laminating direction of the laminated sheet;
cutting the laminated block at positions along the first end part and the second end part of each of the first and second element regions such that first sealing parts corresponding to the through-holes filled with the first sealant are separated on either side thereof;
after the laminated block is cut along the first side part and the second side part of each of the first and second element regions, filling gaps formed by the cutting with a second sealant to form second sealing parts;
cutting along the first and second sealing parts to form a plurality of element laminates;
forming a first external electrode on a first end face of each element laminate; and
forming a second external electrode on a second end face opposing the first end face in the length direction of each element laminate.

12. The method of manufacturing a solid electrolytic capacitor according to claim 11, wherein the notched part is formed in a corner area of each of the first and/or second element regions.

13. The method of manufacturing a solid electrolytic capacitor according to claim 11, wherein the notched part is formed in a plurality of locations.

14. The method of manufacturing a solid electrolytic capacitor according to claim 11, wherein the notched part is provided in a portion bordering the first end part of each of the first and/or second element regions.

15. The method of manufacturing a solid electrolytic capacitor according to claim 11, wherein the notched part is formed along a direction inclined relative to a shortest direction connecting each of the first and/or second element regions and the first end part or the second end part.

16. The method of manufacturing a solid electrolytic capacitor according to claim 11, wherein a width of the notched part is 50 μm to 500 μm.

17. The method of manufacturing a solid electrolytic capacitor according to claim 11, wherein the notched part is filled with the first and/or second sealant.

* * * * *